(12) United States Patent
Pitakdumrongkija et al.

(10) Patent No.: US 9,496,944 B2
(45) Date of Patent: Nov. 15, 2016

(54) RADIO COMMUNICATION SYSTEM AND COMMUNICATION METHOD

(71) Applicants: Boonsarn Pitakdumrongkija, Tokyo (JP); Yoshikazu Kakura, Tokyo (JP); Naoto Ishii, Tokyo (JP)

(72) Inventors: Boonsarn Pitakdumrongkija, Tokyo (JP); Yoshikazu Kakura, Tokyo (JP); Naoto Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 78 days.

(21) Appl. No.: 14/380,359

(22) PCT Filed: Feb. 21, 2013

(86) PCT No.: PCT/JP2013/000971
§ 371 (c)(1),
(2) Date: Aug. 21, 2014

(87) PCT Pub. No.: WO2013/125227
PCT Pub. Date: Aug. 29, 2013

(65) Prior Publication Data
US 2015/0009888 A1 Jan. 8, 2015

(30) Foreign Application Priority Data
Feb. 24, 2012 (JP) .................. 2012-038494

(51) Int. Cl.
*H04B 7/14* (2006.01)
*H04B 7/155* (2006.01)
(Continued)

(52) U.S. Cl.
CPC ......... *H04B 7/15507* (2013.01); *H04W 16/26* (2013.01); *H04W 88/085* (2013.01); *H04W 92/20* (2013.01)

(58) Field of Classification Search
CPC ... H04B 7/2606; H04B 7/155; H04W 88/04; H04W 16/26; H04W 84/047
See application file for complete search history.

(56) References Cited

U.S. PATENT DOCUMENTS

2008/0260000 A1* 10/2008 Periyalwar ........... H04B 1/7143
375/133
2009/0154352 A1* 6/2009 Sun .................... H04W 72/1226
370/235

(Continued)

FOREIGN PATENT DOCUMENTS

GB 2447885 A * 10/2008 ......... H04B 7/15535
IN WO 2011148391 A2 * 12/2011 ............ H04W 24/02

(Continued)

OTHER PUBLICATIONS

International Search Report, Corresponding to PCT/JP2013/000971, dated Apr. 16, 2013, 1 page.

(Continued)

*Primary Examiner* — Hassan Phillips
*Assistant Examiner* — Siren Wei
(74) *Attorney, Agent, or Firm* — Wilmer Cutler Pickering Hale and Dorr LLP

(57) ABSTRACT

A communication system and method that allows a DeNB to identify a RN registered to another DeNB and to acquire necessary information for coordinating interference from RNs registered to the other DeNB are provided. The communication system includes a plurality of communication nodes which includes a plurality of base stations and a plurality of relay nodes, wherein each relay node has a radio connection with a base station, wherein each base station exchanges information indicating identity of a relay node with another base station.

27 Claims, 24 Drawing Sheets

Illustrative Embodiment 2

(51) Int. Cl.
*H04W 16/26* (2009.01)
*H04W 92/20* (2009.01)
*H04W 88/08* (2009.01)

(56) References Cited

U.S. PATENT DOCUMENTS

| | | | | |
|---|---|---|---|---|
| 2011/0244851 A1* | 10/2011 | Gunnarsson | ............ | H04W 8/26 455/423 |
| 2011/0317617 A1* | 12/2011 | Sun | ............ | H04W 84/047 370/315 |
| 2011/0319122 A1* | 12/2011 | Zhou | ............ | H04W 52/146 455/522 |
| 2012/0002592 A1* | 1/2012 | Yang | ............ | H04B 7/155 370/315 |
| 2012/0002598 A1* | 1/2012 | Seo | ............ | H04B 7/2606 370/315 |
| 2012/0083274 A1* | 4/2012 | Tajima | ............ | H04B 7/155 455/436 |
| 2012/0170508 A1 | 7/2012 | Sawai | | |

FOREIGN PATENT DOCUMENTS

| | | |
|---|---|---|
| JP | 2011-91783 A | 5/2011 |
| WO | WO-2011/036837 A1 | 3/2011 |

OTHER PUBLICATIONS

PCT Written Opinion of the International Searching Authority, PCT/ISA/237, corresponding to PCT/JP2013/000971, dated Apr. 16, 2013, 3 pages.

Huawei, "Li Delay Impact on ICIC in Type 1 Relay," 3GPP R1-092376, 3GPP, Jun. 29, 2009, 6 pages.

Huawei, "Understanding on Type 1 and Type 2 Relay," 3GPP R1-092370, 3GPP, Jun. 29, 2009, 5 pages.

TS 36.300 v10.4.0, "3rd Generation Partnership Project; Technical Specification Group Radio Access Network, Evolved Universal Terrestrial Radio Access (E-UTRA) and Evolved Universal Terrestrial Radio Access Network (E-UTRAN); Overall Description Stage 2 (Release 10)", 3GPP, Jun. 2011, 194 pages.

RP 100953, "Work Item Description": Relays for LTE, 3GPP, (http://www.3gpp.org/DynaReportWID-history--460213.htm), Sep. 14, 2010, 4 pages.

Yasuaki Yuda et al., "Interference Mitigation Using Coordinated Backhaul Timing Allocation for LTE-Advanced Relay Systems," ICC 2011, IEEE, 5 pages.

TR 36.814 v9.0.0, "3rd Generation Partnership Project; Technical Specification Group Radio Access Network; Evolved Universal Terrestrial Radio Access (E-UTRA); Further Advancements for E-UTRA Physical Layer Aspects (Release 9)" 3GPP, Mar. 2010, 104 pages.

\* cited by examiner

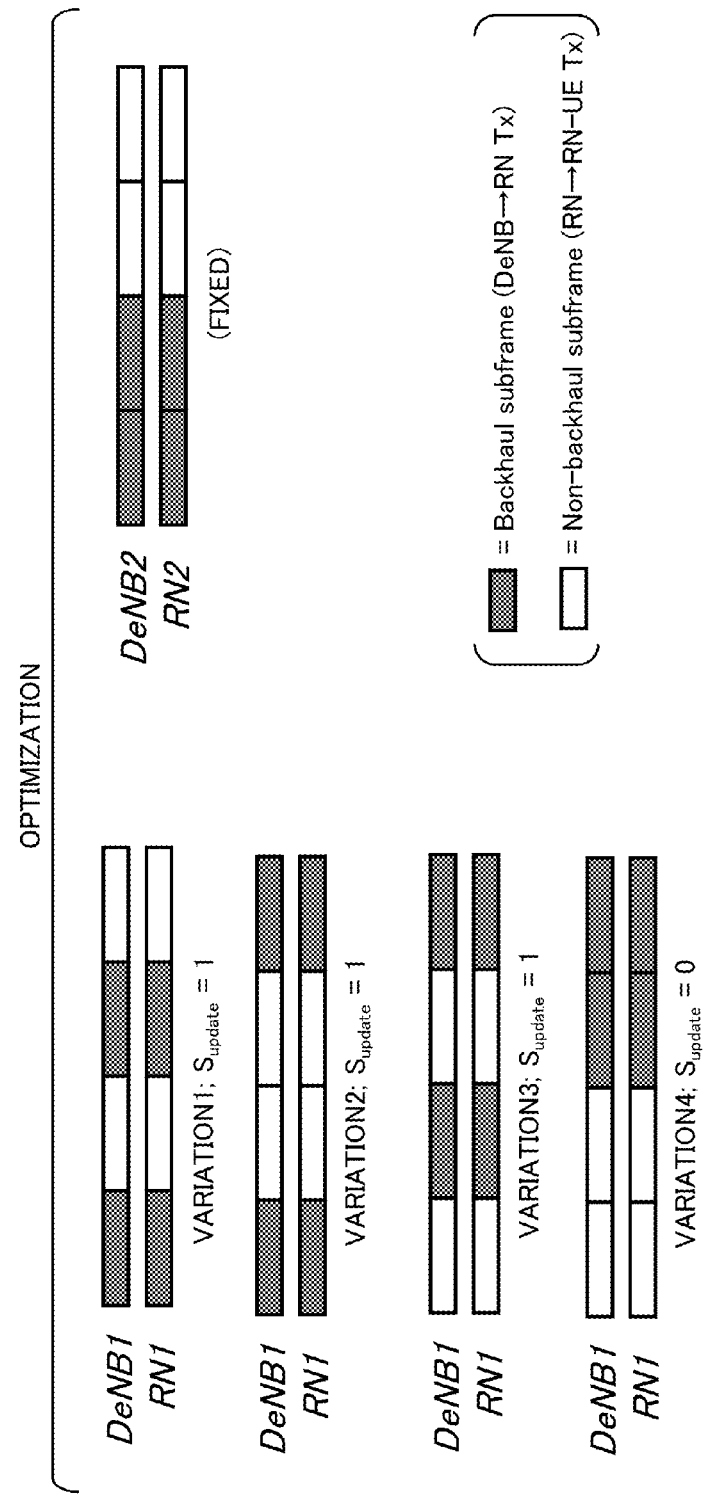
FIG. 10A
FIG. 10B

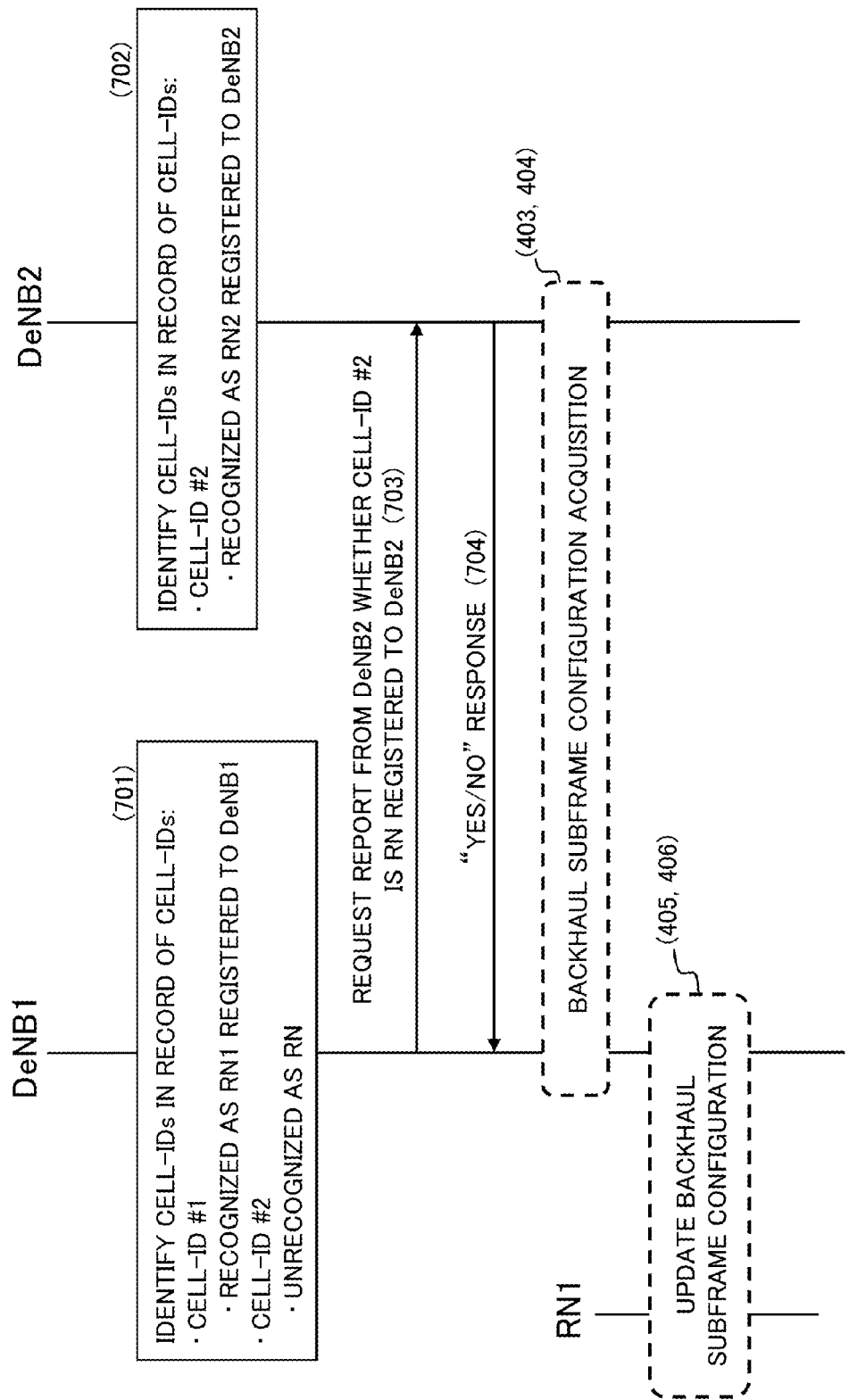
FIG. 11 Illustrative Embodiment 2

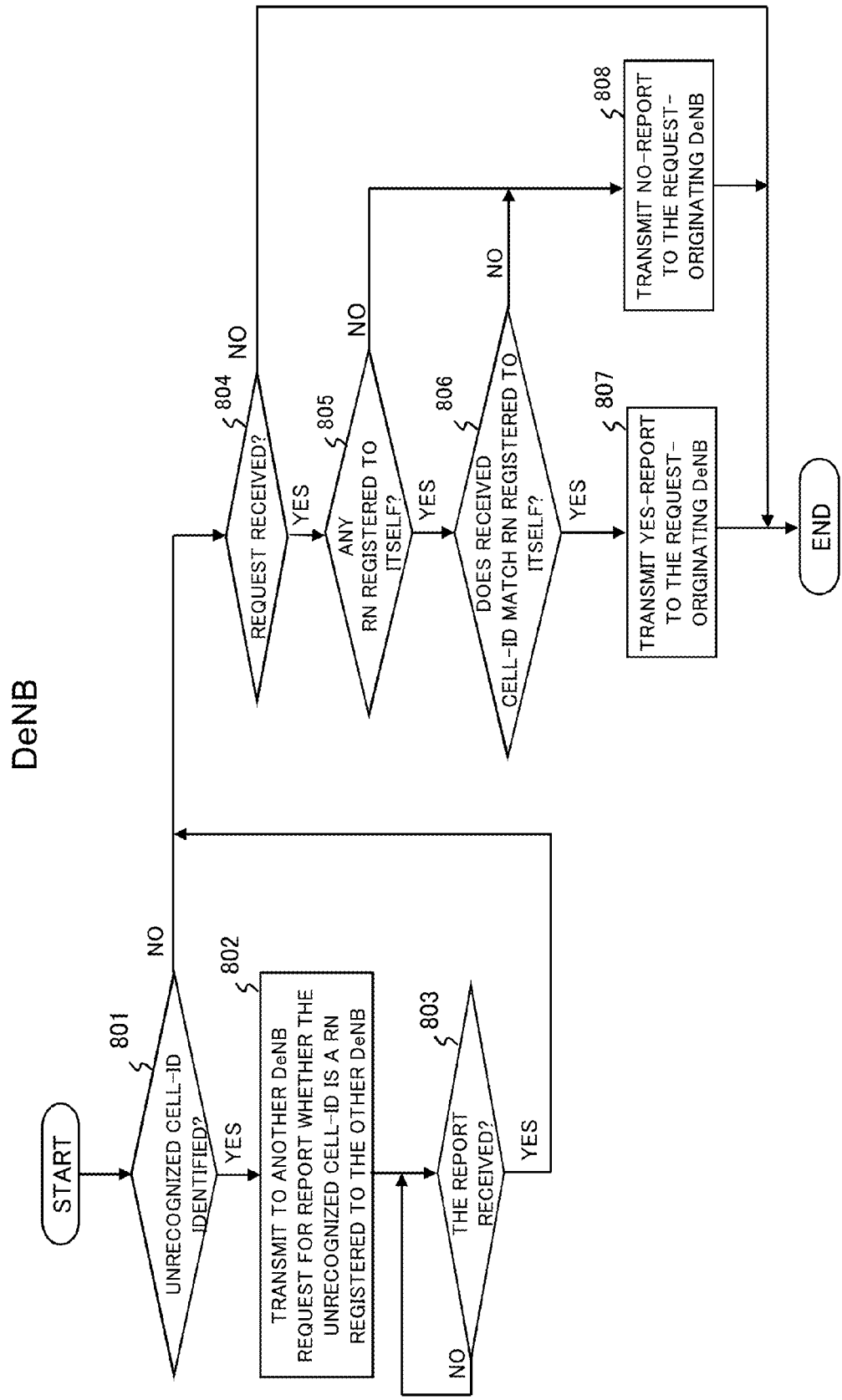

FIG. 20 Illustrative Embodiment 5

Illustrative Embodiment 6

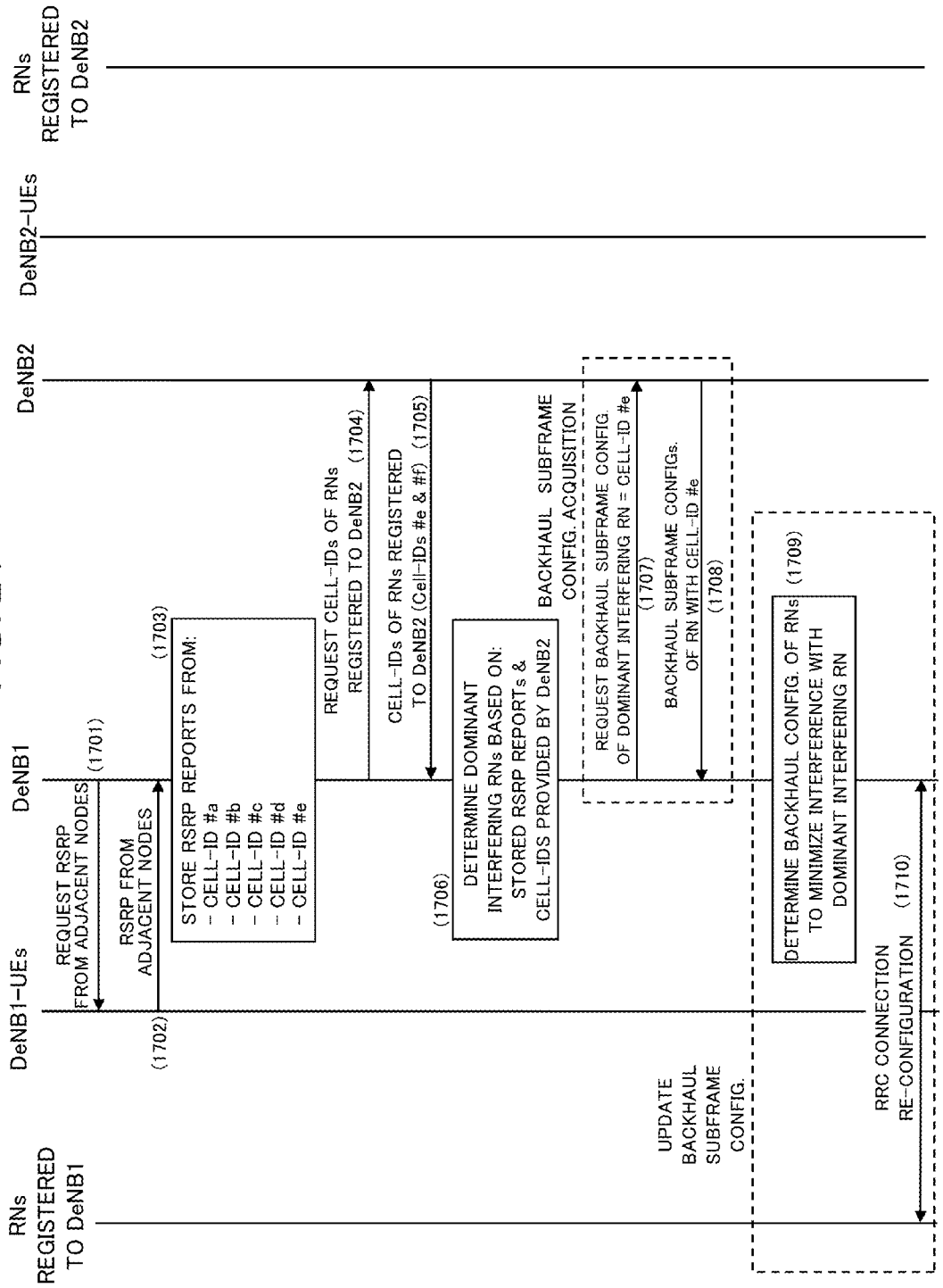

RADIO COMMUNICATION SYSTEM AND COMMUNICATION METHOD

CROSS-REFERENCE TO RELATED APPLICATIONS

The present application is a national stage application of International Application No. PCT/JP2013/00971 entitled "Radio Communication System and Communication Method," filed on Feb. 21, 2013, which claims the benefit of priority from Japanese Patent Application No. JP2012-038494, filed on Feb. 24, 2012, the disclosures of which are incorporated herein in their entirety by reference thereto.

TECHNICAL FIELD

The present invention relates to a radio communication system employing relay nodes, and more particularly to techniques of notifying information about relay nodes in the radio communication system.

BACKGROUND ART

3GPP (3rd Generation Partnership Project) LTE-Advanced (Long Term Evolution Advanced) Work Item develops a relay node (hereafter referred to as RN) for deployment in a cellular network. One of the main objectives for deploying RNs is to enhance coverage area of a base station by improving throughput of a mobile station (user terminal) that locates in a coverage hole or far from the base station (see NPL1). Hereafter, a base station is referred to as BS or eNB (evolved Node B) and a mobile station or user terminal is referred to as UE (user equipment).

In the cellular network with RNs, eNB that can provide radio connection to a RN is called Donor eNB, which is hereafter denoted by DeNB. Note that, in this description, the terms eNB and DeNB are distinguished such that eNB is a base station without any RN connecting to it and DeNB is a base station with at least one RN connecting to it. The radio connection between the DeNB and RN is called a backhaul link (or Un interface) and hereafter, a RN "having a backhaul link connection with" a certain DeNB will be referred to as the RN "registered to" that DeNB. Moreover, the term DeNB-UE is used for referring to UE that establishes a radio connection with DeNB, and the term RN-UE is used for referring to UE that establishes a radio connection with RN. The radio connection between DeNB and DeNB-UE is referred to as DeNB-access link, and the radio connection between RN and RN-UE is referred to as RN-access link (or Uu interface). Currently, 3GPP RAN Working Groups (RAN WGs) are mainly considering a RN called Type1 RN that shares common radio resources among the DeNB-access link, RN-access link, and backhaul link. In order to prevent self-interference at the Type1 RN between the backhaul and RN-access links, both links are time-division multiplexed by semi-statically configuring time-domain radio resources called backhaul subframes, that only allow communication between DeNB and RN (see NPL2 and NPL3).

As shown in FIG. 1, it is assumed for simplicity that the cellular network is composed of different DeNB1 and DeNB2 each controlling different macro-cells (donor-cells) and multiple RNs, which may be registered to the same DeNB or registered to different DeNB1 and DeNB2. In this example, relay nodes RN1 and RN2 are registered to DeNB1 and DeNB2, respectively. The RN1 controls a relay-cell1 and a mobile station RN1-UE and the RN2 controls a relay-cell2 and a mobile station RN2-UE. In downlink communication, it is further assumed that, when the RN1 and RN2 transmit data to their RN-UEs at the same time, interference between RN-access links occurs as shown by dashed lines in FIG. 1, causing the capacity of a RN to be limited.

In order to solve this problem, the backhaul subframe coordination method as in [NPL4] can be applied. In specific, [NPL4] discloses the relay network in which the DeNB coordinates timing allocation for transmitting backhaul link data to each of the multiple RNs (hereafter referred to as backhaul subframe configuration applied at the RN) such that the backhaul subframe timings are differentiated. Therefore, each RN can have different timings compared with the other RNs, for receiving and transmitting the backhaul and RN-access link data, respectively, allowing the interference between RN-access links in the network to be reduced.

CITATION LIST

Non Patent Literature

[NPL 1]
  RP-100953, "Work item description: Relays for LTE," 3GPP
[NPL 2]
  TR 36.814 v9.0.0, "E-UTRA: Further advancements for E-UTRA physical layer aspects (Release 9)," 3GPP
[NPL 3]
  TS 36.300 v10.4.0, "E-UTRA and E-UTRAN: Overall description, Stage 2 (Release 10)," 3GPP
[NPL 4]
  Y. Yuda, A. Iwata, and D. Imamura, "Interference mitigation using coordinated backhaul timing allocation for LTE-Advanced relay systems," ICC 2011, IEEE

SUMMARY

Technical Problem

In order to effectively coordinate backhaul subframe configurations between the RNs registered to different DeNBs, and reduce interference between their RN-access links, the DeNB is required to identify not only the RNs registered to itself but also the RNs registered to another DeNB. Then, based on that knowledge, the DeNB acquires the current backhaul subframe configurations applied at the RNs, which are necessary information for initializing the backhaul subframe coordination.

Currently, the method for a DeNB to identify a certain RN is disclosed in NPL3. In specific, NPL3 discloses a RN recognition procedure for a DeNB to recognize a communication node that operates as RN, and to recognize a Cell-ID associating with that node. Note that, the Cell-ID is an identifier assigned to a communication node that has functionalities of an eNB, which is capable of providing radio access to the UE. Therefore, in a cellular network, the communication node that operates as either eNB, DeNB, or RN is assigned with the Cell-ID.

Referring to FIG. 2, an outline of the RN recognition procedure disclosed in [NPL3] will be described. At the first step of the RN recognition procedure, the RN selects the DeNB that it needs to be registered to. Then, that DeNB and the RN establishes RRC (Radio Resource Control) connection with each other (ST1). During the RRC connection establishment procedure, the RN transmits to the DeNB a RN indicator which notifies the DeNB that it is a communication node operating as RN. After the RRC connection establishment completes, the RN is assigned with a Cell-ID by the OAM (Operation And Management) server (ST2). Then, the RN initiates S1 and X2 interfaces setup procedures (ST3, ST4), which trigger S1 and X2 eNB configuration updates at the DeNB (ST5, ST6). During the X2 eNB configuration update (ST6), the Cell-ID of the RN is added to the neighbor cell list at the DeNB. Therefore, at the end of the X2 eNB configuration update, the DeNB is able to identify the RN registered to it by the Cell-ID.

However, the above-described method of NPL3 only enables the DeNB to recognize the RNs registered to itself as the communication nodes that operate as RNs, because the RN indicator is only sent by the RN to the registered DeNB. Since it is necessary for the DeNB to also recognize RNs registered to different DeNBs in order to acquire their backhaul subframe configurations for coordinating interference, the method in NPL3 cannot realize such objective.

Accordingly, the present invention has been accomplished in consideration of the above mentioned problem, and an object thereof is, to provide a radio communication system and a communication method that allows a DeNB to identify a RN registered to another DeNB and to acquire necessary information for coordinating interference from RNs registered to the other DeNB.

Solution to Problem

According to the present invention, a communication system comprising a plurality of communication nodes which includes a plurality of base stations and a plurality of relay nodes, wherein each relay node has a radio connection with a base station, wherein each base station exchanges information indicating identity of a relay node with another base station.

According to the present invention, a communication method in a communication system comprising a plurality of communication nodes which includes a plurality of base stations and a plurality of relay nodes, wherein each relay node has a radio connection with a base station, the method includes the step of: at base stations, exchanging information indicating identity of a relay node with each another.

According to the present invention, a base station in a communication system comprising a plurality of communication nodes which includes a plurality of base station and a plurality of relay nodes, wherein each relay node has a radio connection with a base station, includes: a communication section for communicating with a relay node by a radio interface and communicating with another base station by a predetermined interface; and a controller for exchanging information indicating identity of a relay node with another base station. According to the present invention, a relay node device in a communication system comprising a plurality of communication nodes which includes a plurality of base stations and a plurality of relay nodes, includes: a radio communication section for connecting with a base station; and a relay-node information manager for reporting whether the communication node is a relay node connected to the base station in response to a request received from another base station. According to the present invention, a relay node device in a communication system comprising a plurality of communication nodes which includes a plurality of base stations and a plurality of relay nodes, includes: a radio communication section for connecting with a base station; and a relay-node information manager for receiving information indicating identity of a different relay node connected to another base station and updating conditions for handover to another communication node.

Advantageous Effects of Invention

As described above, according to the present invention, a DeNB can identify a RN registered to another DeNB, thereby enabling acquisition of necessary information for coordinating interference from RNs registered to the other DeNB.

BRIEF DESCRIPTION OF DRAWINGS

FIG. 10 is a schematic diagram showing an example of current backhaul subframe configuration and its variations.

FIG. 11 is a sequence diagram showing the communication control method of the radio communication system according to a second illustrative embodiment.

FIG. 12 is a flow chart showing the communication control method of the base station (DeNB) according to the second illustrative embodiment.

FIG. 24 is a sequence diagram showing the communication control method of the radio communication system according to the sixth illustrative embodiment.

DETAILED DESCRIPTION

According to illustrative embodiments as described below, each DeNB exchange with another DeNB information related to a node that functions as RN. The DeNB can use the information to coordinate interference from RNs registered to the different DeNB, enabling the optimum backhaul subframe coordination that maximizes the capacity of the RN. First, a radio communication system to which the illustrative embodiments are applied will be explained as an example by making references to FIGS. 3-6.

Figure 1:
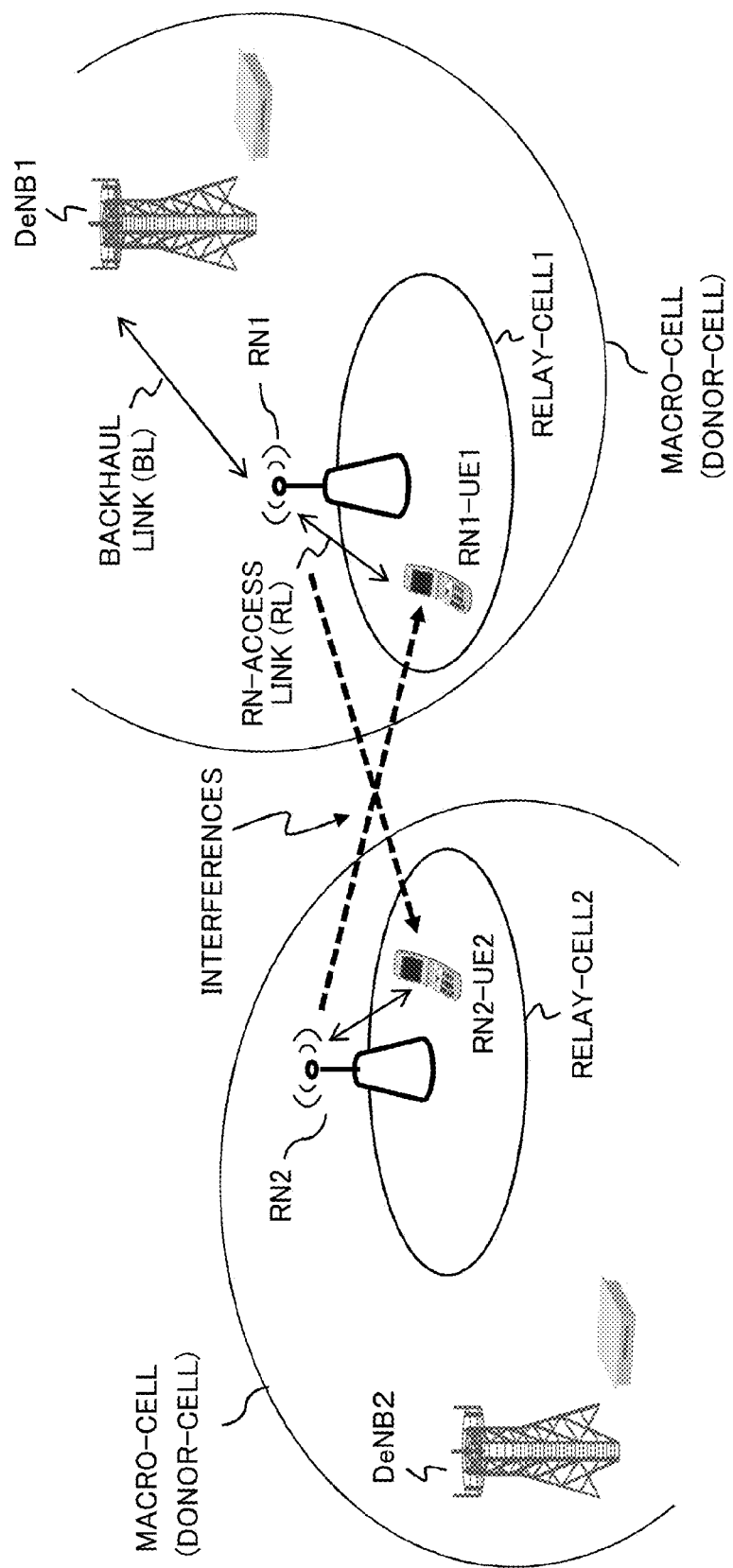
FIG. 1 is a schematic diagram of an illustrative configuration of a radio communication system employing a conventional communication control.
Figure 2:
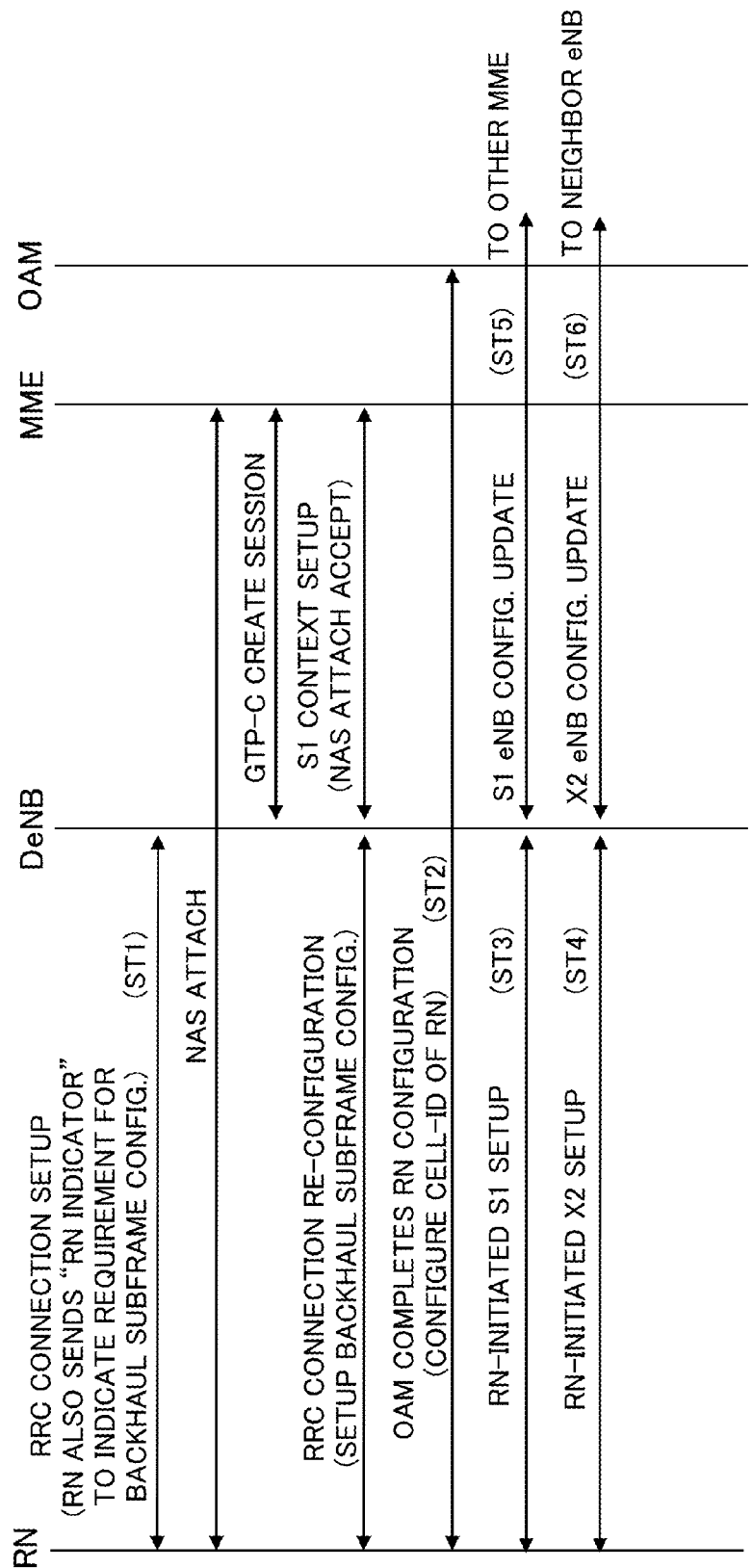
FIG. 2 is a sequence diagram for explaining a conventional RN recognition procedure.
Figure 3:
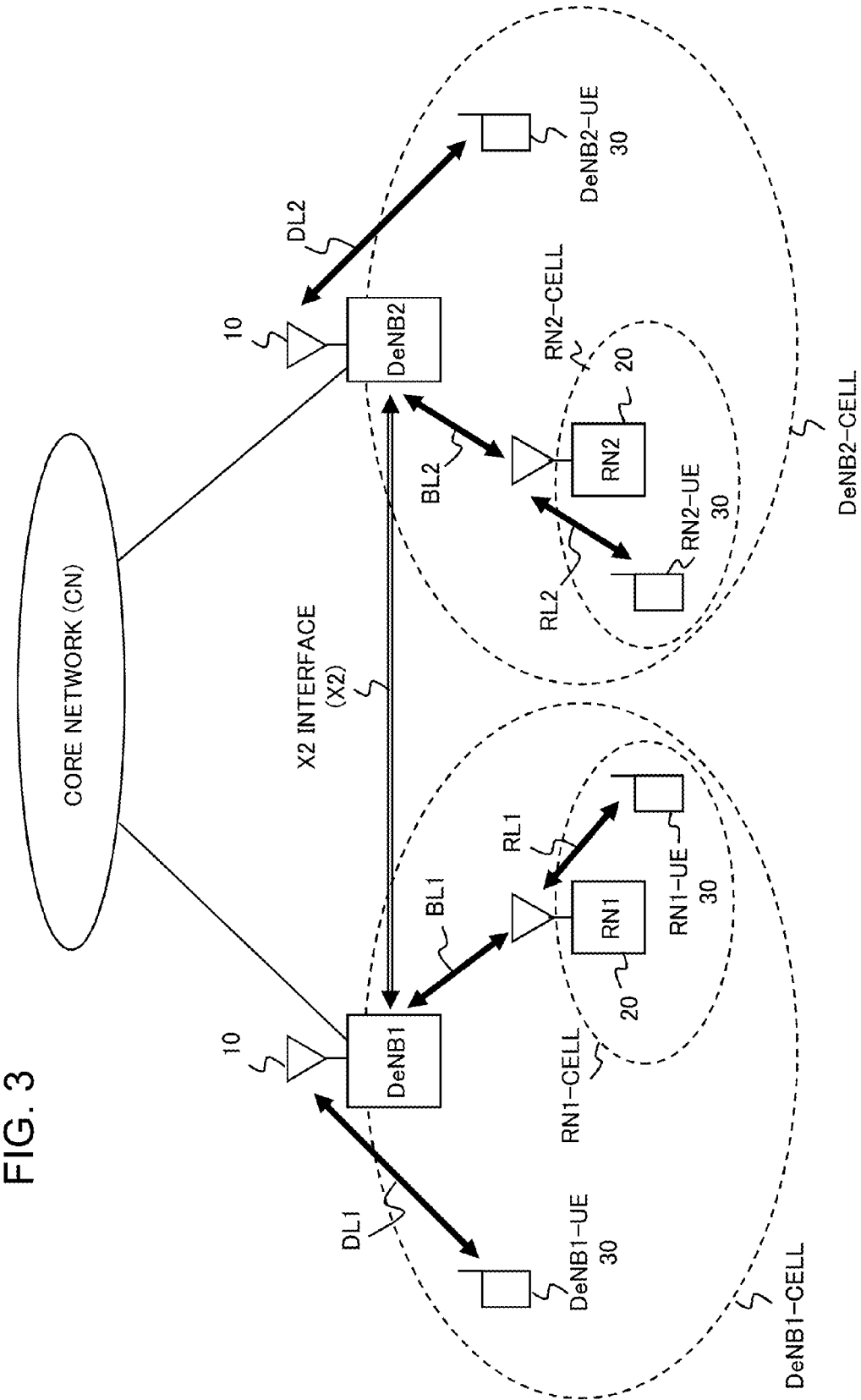
FIG. 3 is a schematic diagram showing a radio communication system to which the present invention is applied.

As shown in FIG. 3, It is assumed for simplicity that a radio communication system is comprised of a plurality of nodes which include base stations (DeNB1, DeNB2) 10, relay nodes (RN1, RN2) 20, and user equipments (DeNB1-UE, RN1-UE, DeNB2-UE, RN2-UE) 30. The DeNB1 controls a macro cell or donor cell (DeNB1-CELL), DeNB1-UE, and RN1 which controls a relay cell (RN1-CELL) and RN1-UE. The DeNB2 controls a macro cell or donor cell (DeNB2-CELL), DeNB2-UE, and RN2 which controls a relay cell (RN2-CELL) and RN2-UE. The DeNB1 provides a radio connection to the DeNB1-UE through a DeNB-access link DL1 and a radio connection to the RN1 through a backhaul link (or Un link) BL1. The RN1 also provides a radio connection to the RN1-UE through RN-access link (or Uu link) RL1. Similarly, the DeNB2 provides a radio connection to the DeNB2-UE through a DeNB-access link DL2 and a radio connection to the RN2 through a backhaul link (or Un link) BL2. The RN2 also provides a radio connection to the RN2-UE through RN-access link (or Uu link) RL2. The DeNB1 and the DeNB2 are connected to each other through a X2 interface and are connected to a core network (CN). Although FIG. 3 shows a single DeNB-UE and a single RN-UE for each DeNB-CELL and RN-CELL, respectively, both DeNB 10 and each RN are capable of providing connections to multiple UEs simultaneously.

Figure 4:
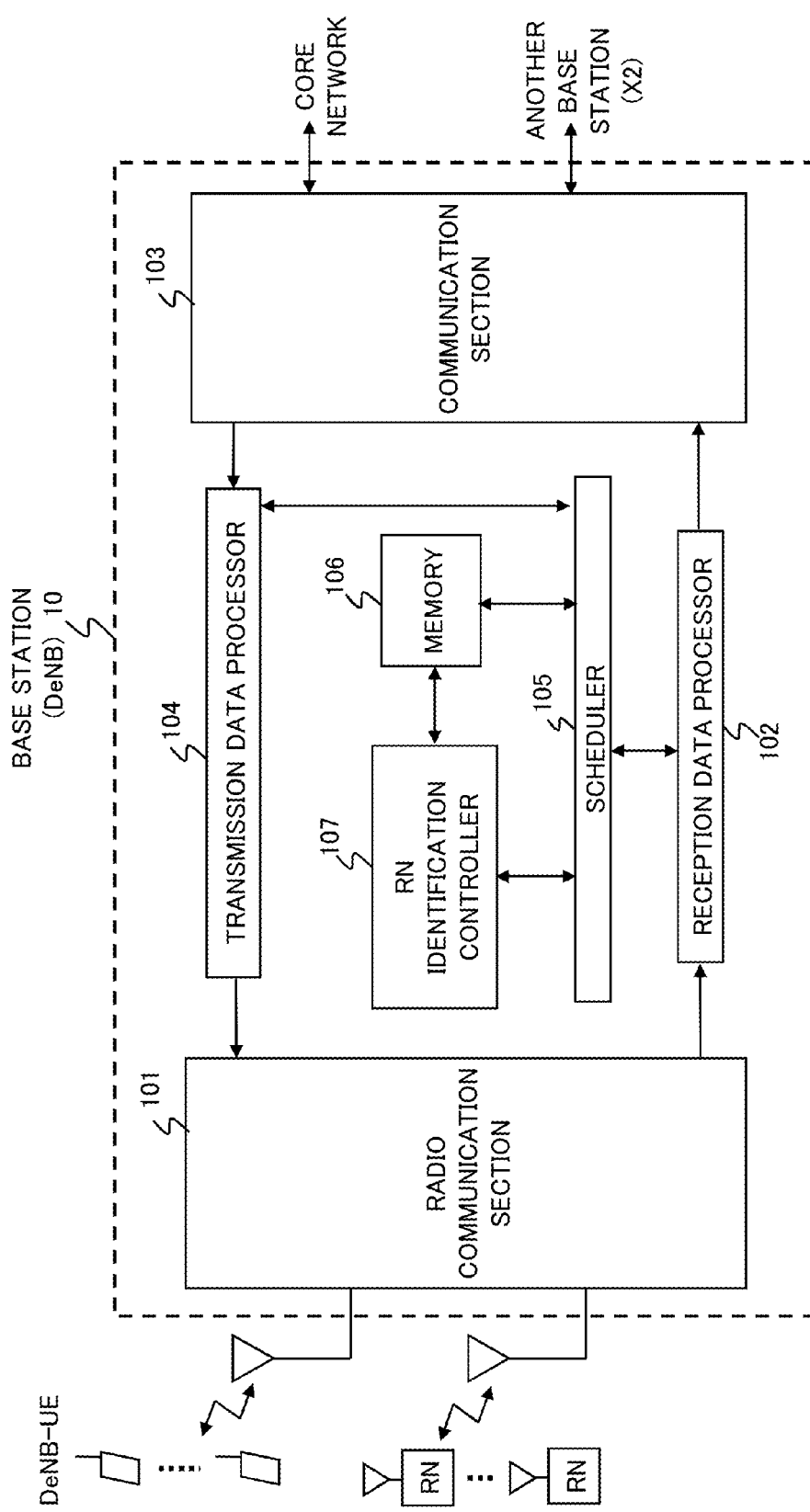
FIG. 4 is a block diagram of an illustrative configuration of a base station which is common for illustrative embodiments of the present invention.

Referring to FIG. 4, DeNB 10 (DeNB1, DeNB2) is provided with a radio communication section 101 which performs radio communications with the DeNB-UE and the RNs through antennas. The radio communication section 101 receives uplink signals from the DeNB-UE and the RNs and outputs the uplink received signals to a reception data processor 102. The reception data processor 102 performs procedures including signal combining, demodulation, and channel decoding to retrieve data from the uplink received signals. The resulting received data are forwarded to a core network through a communication section 103. When receiving a request or report about information related to Cell-ID of RN from a RN identification controller 107, the communication section 103 forward it to another base station through the X2 interface. When receiving a request or report about information related to Cell-ID of RN from another DeNB through the X2 interface, the communication section 103 forward it to the RN identification controller 107.

A transmission data processor 104 stores data received from the communication section 103 in a buffer (not shown) before transmitting to the DeNB-UE and the RNs. The transmission data processor 104 performs channel encoding, rate matching, and interleaving on the data stored in the buffer in order to create transport channels. Then, the transmission data processor 104 adds control information to the transport channels and creates radio frames. The transmission data processor 104 also performs symbol mapping and creates transmission symbols. The radio communication section 101 modulates and amplifies transmission symbols to create downlink signals and then transmits the downlink signals to the DeNB-UE and the RNs through the antennas.

A scheduler 105 controls radio resource allocation for transmitting data to the DeNB-UEs and the RNs by considering scheduling metrics of the DeNB-UEs and the RNs. The scheduling metrics are created by the scheduler 105 based on channel qualities of DeNB-access links DLs and the backhaul links BLs, and priorities of data to be transmitted to the DeNB-UEs and the RNs. When receiving information related to Cell-IDs of adjacent RNs from the RN identification controller 107, the scheduler 105 sends the information to the RNs through the transmission data processor 104.

A memory 106 stores Cell-IDs, information indicating what Cell-ID represents RN, and X2 interface routing table. Such information is updated or provided based on demand from the RN identification controller 107.

The RN identification controller 107 Issues a request or report about information related to Cell-ID of RN to another DeNB through the communication section 103. When receiving a request or report about information related to Cell-ID of RN through the communication section 103, the RN identification controller 107 notifies the RN of the information related to Cell-ID of adjacent RN through the scheduler 105. Functions of the reception data processor 102, the transmission data processor 104, the scheduler 105 and the RN identification controller 107 can be implemented by a program-controlled processor such as a CPU (central processing unit) or a computer running respective programs which are stored in a memory (not shown).

Figure 5:
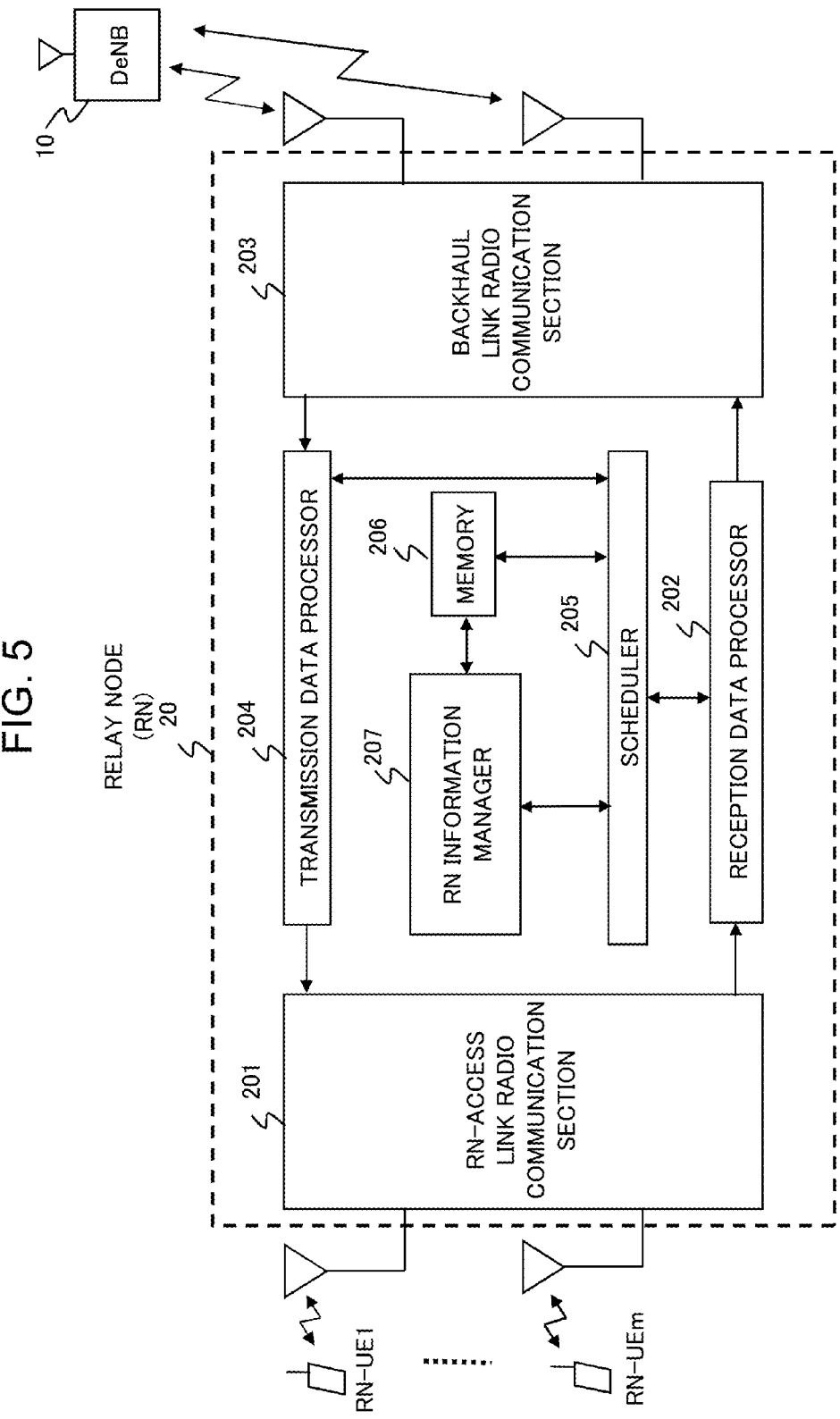
FIG. 5 is a block diagram of an illustrative configuration of a relay node which is common for the illustrative embodiments.

Referring to FIG. 5, it is assumed that RN 20 is registered to the DeNB 10 and has the same functionalities as DeNB with some exceptions that will be explained explicitly. A RN-access link radio communication section 201 receives uplink signals from RN-UEs through antennas. A reception data processor 202, similar to the reception data processor 102 of the DeNB 10, forwards the received data to the DeNB 10 through a backhaul link radio communication section 203. A transmission data processor 204 and its buffer (not shown), similar to the transmission data processor 104 and its buffer of the DeNB 10, creates transmitted symbols based on data destined to the RN-UEs received from the backhaul link radio communication section 203. Then, the RN-access link radio communication section 201 creates downlink signals from the transmitted symbols and transmits them to the RN-UEs.

A scheduler 205 controls radio resource allocation for transmitting data to the RN-UEs by considering scheduling metrics of RN-UEs. The scheduling metrics are created by the scheduler 205 based on channel qualities of the RN-access links RLs, and priorities of data to be transmitted to the RN-UEs. When receiving a request from DeNB 10, the scheduler 205 forwards it to a RN information manager 207. When receiving a report from the RN information manager 207, the scheduler 205 sends it to DeNB 10 through the reception data processor 202. When receiving information related to Cell-ID of adjacent RN from DeNB 10, the scheduler 205 forwards it to the RN information manager 207.

A memory 206 stores the information related to Cell-ID of adjacent RN and priority for handover (HO) to other node based on demand of the RN information manager 207. The RN information manager 207, when receiving a request from the DeNB 10 through the scheduler 205, sends a report to the DeNB 10 through the scheduler 205. When receiving the information related to Cell-ID of adjacent RN from the scheduler 205, updates priority for HO to other node, and stores both the notified information and the updated priority in the memory 206.

Figure 6:
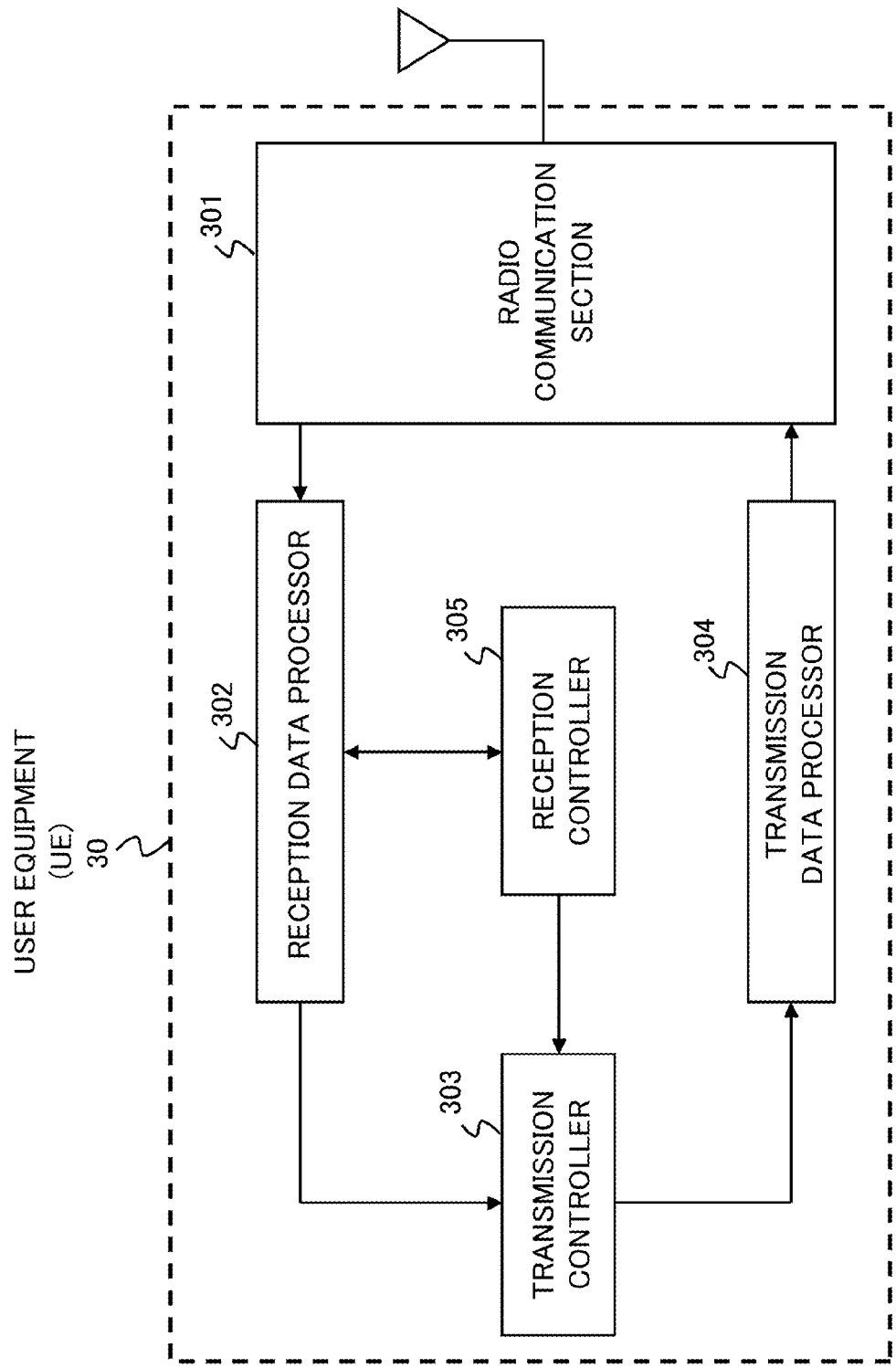
FIG. 6 is a block diagram of an illustrative configuration of a mobile station (UE) which is common for the illustrative embodiments.

Referring to FIG. 6, UE 30 includes a radio communication section 301, reception data processor 302, a transmission controller 303, transmission data processor 304 and reception controller 305. The radio communication section 301 receives radio signals from the DeNB 10 or RN 20 through an antenna. The reception data processor 302 performs a process for retrieving data from the received downlink signals and notifies the transmission controller 303, which controls the transmission operation of the UE 30, of the reception processing result. The transmission controller 303 then transmits the reception processing result to the DeNB 10 or RN 20 through the transmission data processor 304 and the radio communication section 301.

On the other hand, when data to be transmitted are generated, the transmission data processor 304 outputs the transmission data under the control of the transmission controller 303 to the communication section 301. The radio communication section 301 creates uplink signals from the transmission data received from the transmission data processor 304, and transmits them to the DeNB 10 or RN 20.

1. FIRST ILLUSTRATIVE EMBODIMENT

According to the first illustrative embodiment, each DeNB requests another DeNB to report a Cell-ID of RN registered to the other DeNB. In response to the request, the other DeNB reports the Cell-ID of RN registered to itself to the request-originating DeNB. Since the Cell-ID of RN registered to the other DeNB is obtained, the DeNB can acquire backhaul subframe configuration applied at the RN registered to the other DeNB, so that backhaul subframe configuration applied at a RN registered to itself can be updated so as to achieve the optimum backhaul subframe coordination that maximizes the capacity of the RN. Taking as an example the network shown in FIG. 3, a control operation of the above-mention system according to the first illustrative embodiment will be explained by making references to FIGS. 7-10.

1.1) System Operation

Figure 7:
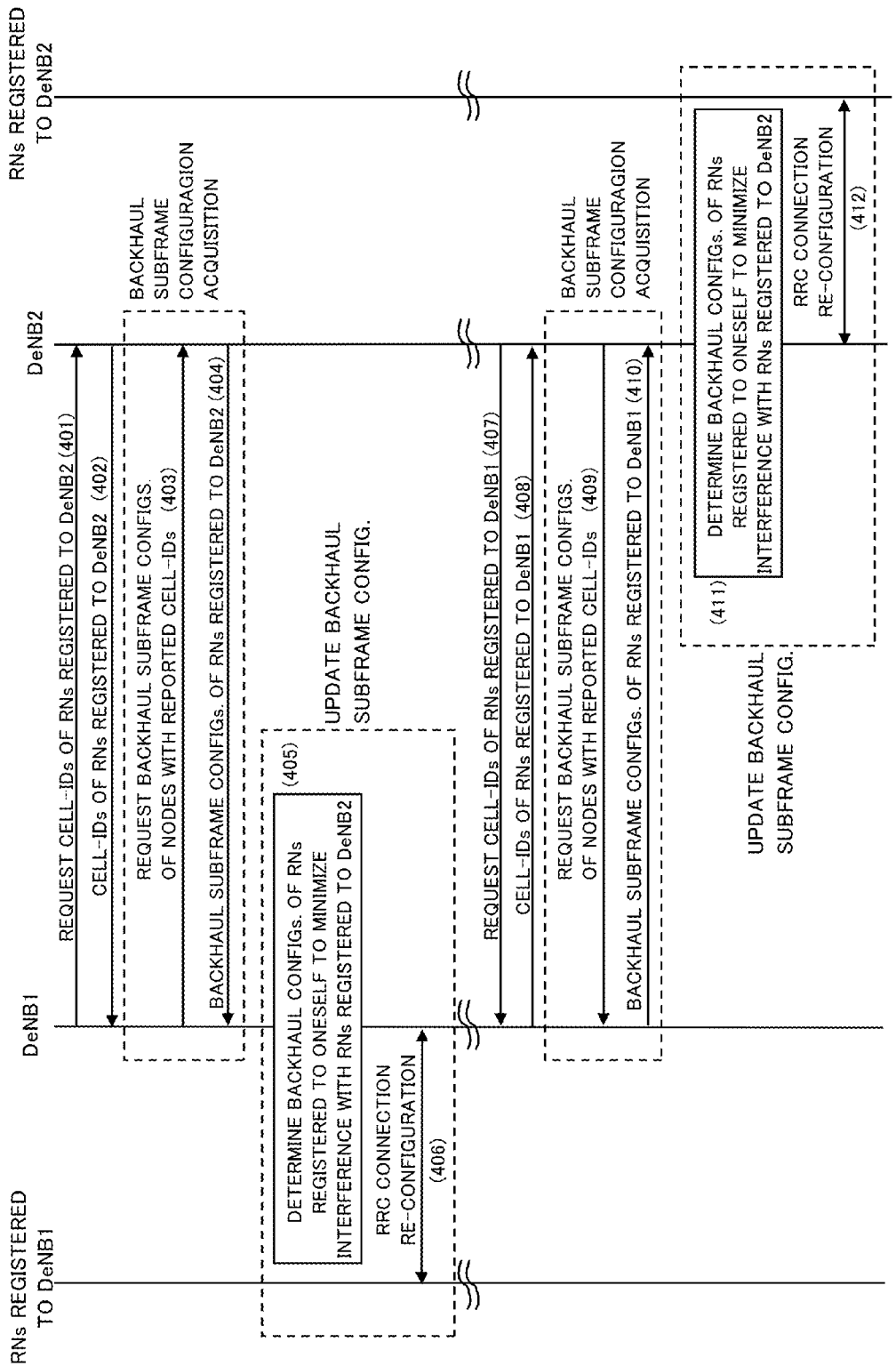
FIG. 7 is a sequence diagram showing the communication control method of the radio communication system according to a first illustrative embodiment.

Referring to FIG. 7, the DeNB1 requests a Cell-ID report of Cell-ID of RN registered to the DeNB2 (operation 401) and the DeNB2 sends the Cell-ID report of Cell-ID of RN registered to itself as a response to the request (operation 402). When receiving the Cell-ID report from the DeNB2, the DeNB1 starts acquisition of backhaul subframe configuration by requesting a configuration report of the backhaul subframe configuration of a node assigned each reported Cell-ID (operation 403). As a response to the configuration request, the DeNB1 receives the configuration report from the DeNB2 and acquires the backhaul subframe configuration of RN registered to the DeNB2 (operation 404).

The DeNB1 uses the backhaul subframe configuration of RN registered to the DeNB2 to determine the backhaul configuration of its own so as to minimize interference with RN registered to the DeNB2 (operation 405). Thereafter, the DeNB1 performs RRC connection re-configuration to apply the determined backhaul subframe configurations (operation 406). The update of backhaul subframe configuration will be described later.

The DeNB2 also performs the operations similar to the above-mentioned operations at the DeNB1 and acquires the backhaul subframe configuration of RN registered to the DeNB1 (operations 407-410). The DeNB2 uses the backhaul subframe configuration of RN registered to the DeNB1 to determine the backhaul configuration of its own so as to minimize interference with RN registered to the DeNB1 (operation 411) and performs RRC connection re-configuration to apply the determined backhaul subframe configuration (operation 412).

In this way, each DeNB requests and acquires Cell-IDs and backhaul subframe configurations of RNs registered to another DeNB. Based on the reported information, the DeNB can determine the backhaul configurations of RNs registered to itself so as to minimize interference with RNs registered to the other DeNB.

1.2) DeNB Operation

Figure 8:
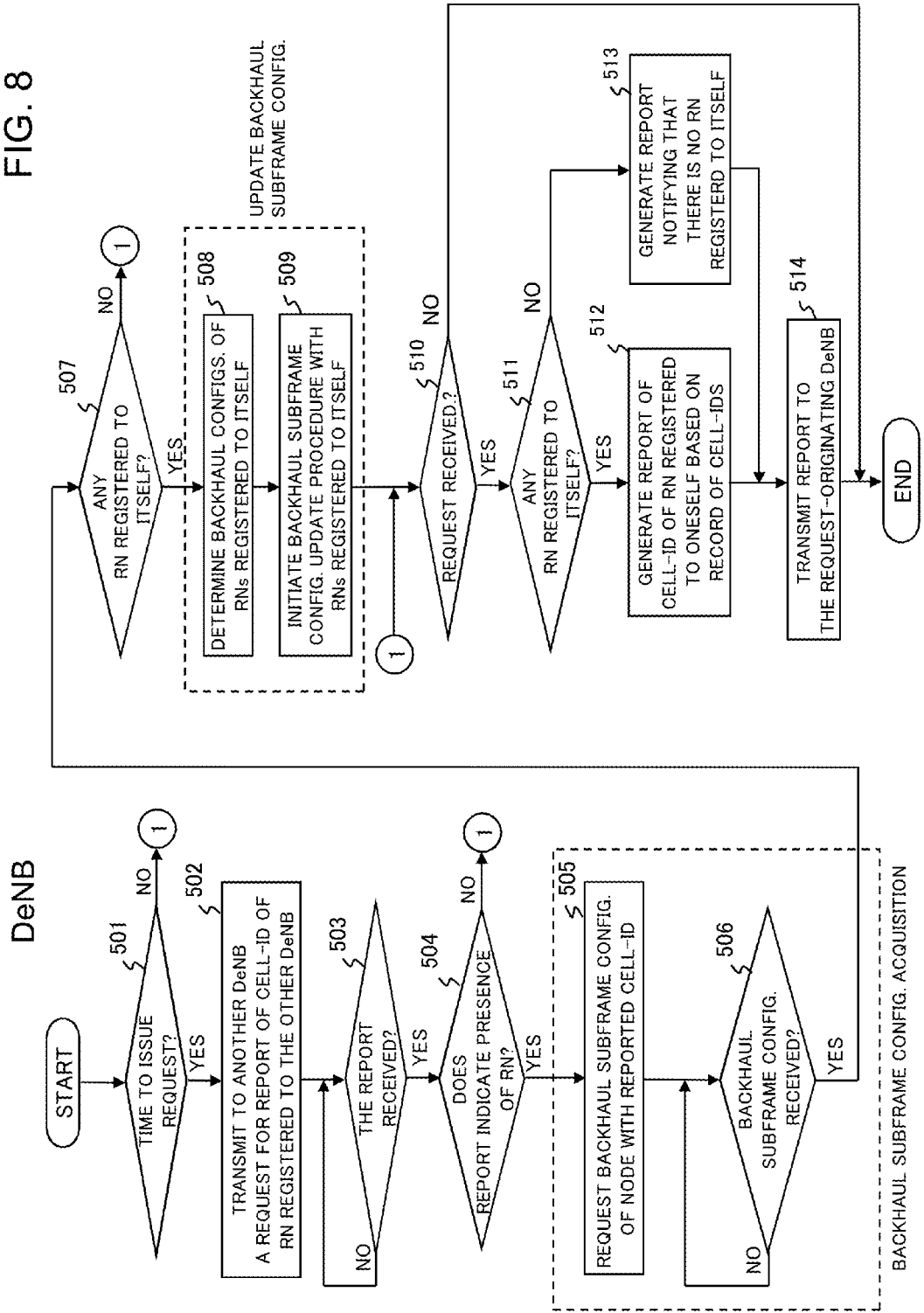
FIG. 8 is a flow chart showing the communication control method of the base station (DeNB) according to the first illustrative embodiment.

Referring to FIG. 8, the scheduler 105 checks whether it is time to issue a request for Cell-ID report (operation 501). Time to issue the request can be controlled by operator or periodically, or when there is a change in the number of RNs and/or backhaul subframe configuration. When it is time to issue a request for Cell-ID report (operation 501; YES), the RN identification controller 107 controls the scheduler 105 and transmits to another DeNB a request for report of Cell-ID of RN registered to the other DeNB (operation 502).

When receiving the Cell-ID report from the other DeNB (operation 503; YES), the RN identification controller 107 determines whether the Cell-ID report indicates any RN registered to the other DeNB (operation 504). When at least one RN registered to the other DeNB is present (operation 504; YES), the RN identification controller 107 controls the scheduler 105 and transmits to the other DeNB a request for configuration report of the backhaul subframe configuration of a node assigned each reported Cell-ID (operation 505). Thereafter, the scheduler 105 enters a state of waiting for the configuration report (operation 506; NO).

When receiving the configuration report as a response to the configuration request (operation 506; YES), the RN identification controller 107 determines whether any RN is registered to the DeNB (operation 507) and, when at least one RN is registered to the DeNB (operation 507; YES), the RN identification controller 107 updates the backhaul subframe configuration for the registered RN (operations 508-509). More specifically, the RN identification controller 107 uses the backhaul subframe configuration of RN registered to the other DeNB to determine the backhaul configuration of the RN registered to itself (operation 508) and initiates an update procedure of the backhaul subframe configuration with the RN registered to itself (operation 509).

Thereafter, the RN identification controller 107 enters a state of waiting for reception of a request from the other DeNB (operation 510). The operation 510 is also performed when it is not time to issue a request for Cell-ID report (operation 501; NO), when the received report indicates no RN registered to the other DeNB (operation 504; YES), or when no RN is registered to the DeNB (operation 507; NO).

When a Cell-ID request has been received from another DeNB (operation 510; YES), the RN identification controller 107 determines whether any RN is registered to the DeNB (operation 511). When at least one RN is registered to the DeNB (operation 511; YES), the RN identification controller 107 generates a Cell-ID report indicating Cell-ID of RN registered to itself based on a record of Cell-IDs stored in the memory 106 (operation 512). When no RN is registered to the DeNB (operation 511; NO), the RN identification controller 107 generates a Cell-ID report indicating no RN is registered to itself (operation 513). The RN identification controller 107 controls the scheduler 105 and transmits the Cell-ID report thus generated to the request-originating DeNB (operation 514).

As a modified example, in the case where the request-receiving DeNB has no RN registered to itself, the request-receiving DeNB may transmit no report to the request-originating DeNB. When having not received any report as a response to the Cell-ID request, the request-originating DeNB may assume that there is no RN registered to the request-receiving DeNB.

1.3) RN Operation

Figure 9:
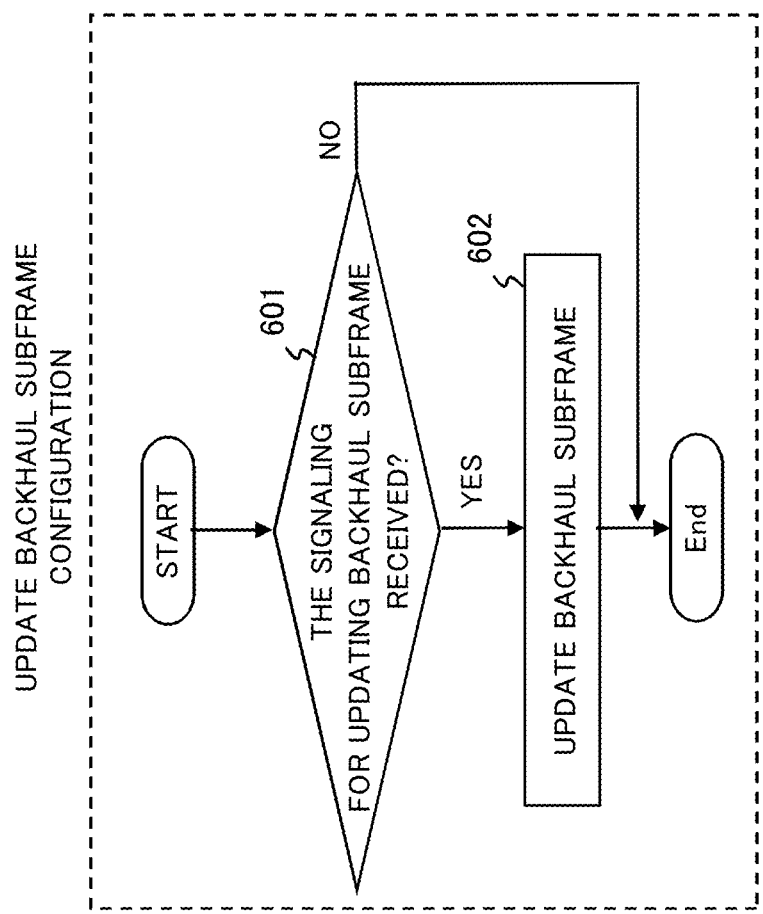
FIG. 9 is a flow chart showing the communication control method of the relay node (RN) according to the first illustrative embodiment.

Referring to FIG. 9, when receiving the signaling for updating backhaul subframe from the DeNB1 or DeNB2 through the backhaul link radio communication section 203, the transmission data processor 204 and the scheduler 205 (operation 601; YES), the RN information manager 207 stores information included in the signaling in the memory 206 and the scheduler 205 updates backhaul subframes according to the stored information (operation 602).

1.4) Example

The backhaul subframe configurations can be determined by Initialization and Optimization.
(Initialization)
Assuming current backhaul subframe configurations as shown in (A) in FIG. 10, system constraint derived from current backhaul subframe configurations is as follows:
Number of backhaul subframes at DeNB1=2, and
Number of backhaul subframe at RN1=1.
Current number of RL interfering subframes ($S_0$)=2, which is the number of non-backhaul subframes of RN1 overlapping with RN2.
(Optimization)
Referring to (B) in FIG. 10, the algorithm for Optimization will be described as follows:
Step 1. Set b=1, where b=Index of RN registered to DeNB1
Step 2. Vary backhaul subframe configuration of the b-th RN assuming that the backhaul subframe configuration of RN registered to DeNB2 is fixed, under the system constraint
Step 3. Evaluate the number of RL interfering subframes ($S_{update}$) with respect to the variation in the backhaul subframe configuration of the b-th RN
Step 4. If $S_{update} < S_0$, replace the current backhaul subframe configuration with the variation. Otherwise, keep the current backhaul subframe configuration
Step 5. Repeat 2. to 4. until all variations of backhaul subframe configuration of the b-th RN are evaluated
Step 6. Update b=b+1 and repeat 2. to 6. until all RNs registered to DeNB1 are evaluated.

1.5) Advantageous Effect

As described above, according to the first illustrative embodiment, each DeNB requests a different DeNB to report a Cell-ID of RN registered to the different DeNB to identify a RN registered to the different DeNB. Accordingly, the DeNB can use the Cell-ID of RN registered to the different DeNB to acquire backhaul subframe configuration applied at the RN registered to the different DeNB. Based on the backhaul subframe configuration applied at the RN registered to the different DeNB, the DeNB can update backhaul subframe configurations applied at RNs registered to itself, achieving the optimum backhaul subframe coordination.

2. SECOND ILLUSTRATIVE EMBODIMENT

According to the second illustrative embodiment, when a DeNB has identified an unrecognized Cell-ID which does not match any of Cell-IDs of RNs registered to the DeNB, the DeNB requests another DeNB to report whether the unrecognized Cell-ID represents a node that operates as RN registered to the other DeNB. When having received the report that the unrecognized Cell-ID represents the RN registered to the other DeNB, the DeNB can perform the acquisition of backhaul subframe configuration and the update of backhaul subframe configurations applied at RNs registered to itself as described in the first illustrative embodiment. Taking as an example the network shown in FIG. 3, a control operation of the above-mention system according to the second illustrative embodiment will be explained by making references to FIGS. 11 and 12.

2.1) System Operation

It is assumed that each DeNB previously stores the Cell-IDs of communication nodes, which also include Cell-IDs of RNs registered to itself.

Referring to FIG. 11, the DeNB1 identifies a Cell-ID #1 as its RN1 and a Cell-ID #2 as unrecognized (operation 701). The DeNB2 identifies the Cell-ID #2 as its RN2 (operation 702). It is preferable to identify a Cell-ID causing greater interference than other Cell-IDs. A plurality of Cell-IDs that cause interference greater than a predetermined level and are not recognized as the registered RN by the DeNB may be identified as unrecognized.

The DeNB1 requests a report from the DeNB2 whether the unrecognized Cell-ID #2 represents a RN registered to the DeNB2 (operation 703). When having received the request from the DeNB1, the DeNB2 sends back to the DeNB1 a YES/NO response indicating whether the Cell-ID #2 represents a RN registered to the DeNB2 (operation 704). When receiving the YES response indicating that the Cell-ID #2 represents a RN registered to the DeNB2, the DeNB1 starts the backhaul subframe configuration acquisition (operation 403 and 404) and the update of backhaul subframe configuration (operations 405 and 406). The backhaul subframe configuration acquisition and the update of backhaul subframe configuration are similar to those described in FIG. 7 and therefore detailed descriptions are omitted.

2.2) DeNB Operation

Referring to FIG. 12, the RN identification controller 107 identifies the Cell-IDs stored in the memory 106 and determines whether an unrecognized Cell-ID exists (operation 801). When an unrecognized Cell-ID is found (operation 801; YES), the RN identification controller 107 transmits to a different DeNB a request for report whether the unrecognized Cell-ID represents a node that operates as RN registered to the different DeNB (operation 802) before entering a state of waiting for reception of the report (operation 803).

When having received the report (operation 803; YES) or when an unrecognized Cell-ID does not exist in the memory 106 (operation 801; NO), the RN identification controller 107 determines whether a request for report whether a Cell-ID represents a RN registered to the DeNB is received from another DeNB (operation 804). When such a request has been received from another DeNB (operation 804; YES), the RN identification controller 107 further determines whether any RN is registered to the DeNB (operation 805). When at least one RN is registered to the DeNB (operation 805; YES), the RN identification controller 107 determines whether the Cell-ID included in the received request represents a RN registered to the DeNB (operation 806). When the Cell-ID included in the received request represents a RN registered to the DeNB (operation 806; YES), the RN identification controller 107 controls the scheduler 105 and transmits a YES—report to the request-originating DeNB (operation 807). When the Cell-ID included in the received request does not represent any RN registered to the DeNB (operation 806; NO) or when no RN is registered to the DeNB (operation 805; NO), the RN identification controller 107 controls the scheduler 105 to transmit a NO-report to the request-originating DeNB (operation 808). Alternatively, when no RN is registered to the DeNB (operation 805; NO), the RN identification controller 107 may control the scheduler 105 not to transmit any report to the request-originating DeNB.

2.3) Advantageous Effect

As described above, according to the second illustrative embodiment, each DeNB only needs to send a request when it has unrecognized Cell-ID, thereby reducing the amount of signaling in the network.

In addition, the second illustrative embodiment has advantageous effects similar to those of the first illustrative embodiment. The DeNB can use the Cell-ID of RN registered to the different DeNB to acquire backhaul subframe configuration applied at the RN registered to the different DeNB. Based on the backhaul subframe configuration applied at the RN registered to the different DeNB, the DeNB can update backhaul subframe configurations applied at RNs registered to itself, achieving the optimum backhaul subframe coordination.

3. THIRD ILLUSTRATIVE EMBODIMENT

According to the third illustrative embodiment, each DeNB cannot recognize a Cell-ID as a RN registered to another DeNB but knows a logical routing path to that node having that Cell-ID. Accordingly, when a DeNB has identified an unrecognized Cell-ID which does not match any of Cell-IDs of RNs registered to the DeNB, the DeNB can send a request for report whether the unrecognized Cell-ID represents a RN, to the node with the unrecognized Cell-ID by referring to a routing table. When having received such a request, the node with the unrecognized Cell-ID reports whether the unrecognized Cell-ID represents a RN. Based on the report that the unrecognized Cell-ID represents the RN, the DeNB can perform the acquisition of backhaul subframe configuration and the update of backhaul subframe configurations applied at RNs registered to itself as described in the first illustrative embodiment. First, a radio communication system to which the third illustrative embodiment is applied will be explained as an example by making references to FIGS. 13 and 14.

Figure 13:
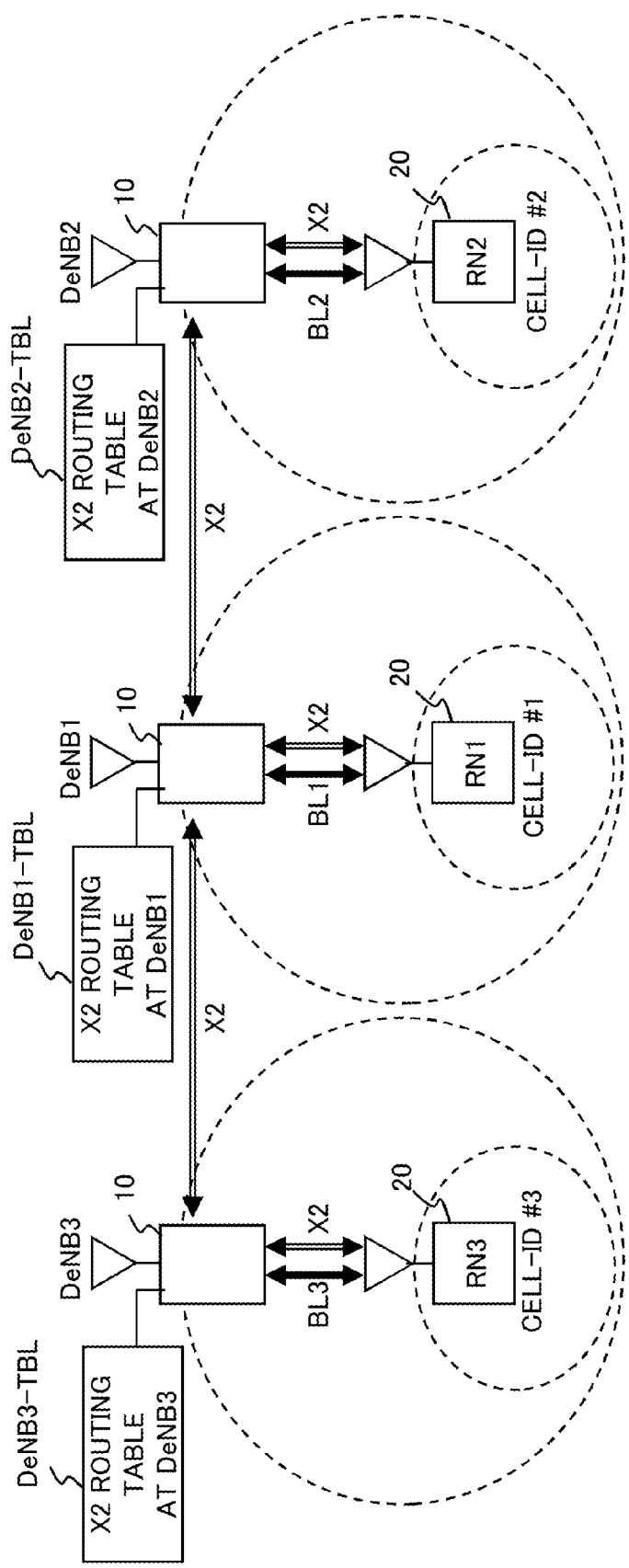
FIG. 13 is a schematic diagram showing a radio communication system for explaining an operation of a third illustrative embodiment.

As shown in FIG. 13, it is assumed for simplicity that a radio communication system is comprised of a plurality of nodes which include base stations (DeNB1-DeNB3) and relay nodes (RN1-RN3), wherein each DeNB is provided with a X2 routing table (DeNB1-TBL, DeNB2-TBL, DeNB3-TBL) stored in the memory 106. The DeNB1-DeNB3 provide radio connections to the RN1-RN3 through backhaul links (or Un links) BL1-BL3, respectively. The DeNB1-DeNB3 are connected to each other through the X2 interface and are also connected to the RN1-RN3 through the X2 interfaces, respectively. In this example, the RN1-RN3 are assigned Cell-ID#1, Cell-ID #2, and Cell-ID #3, respectively.

Figure 14:
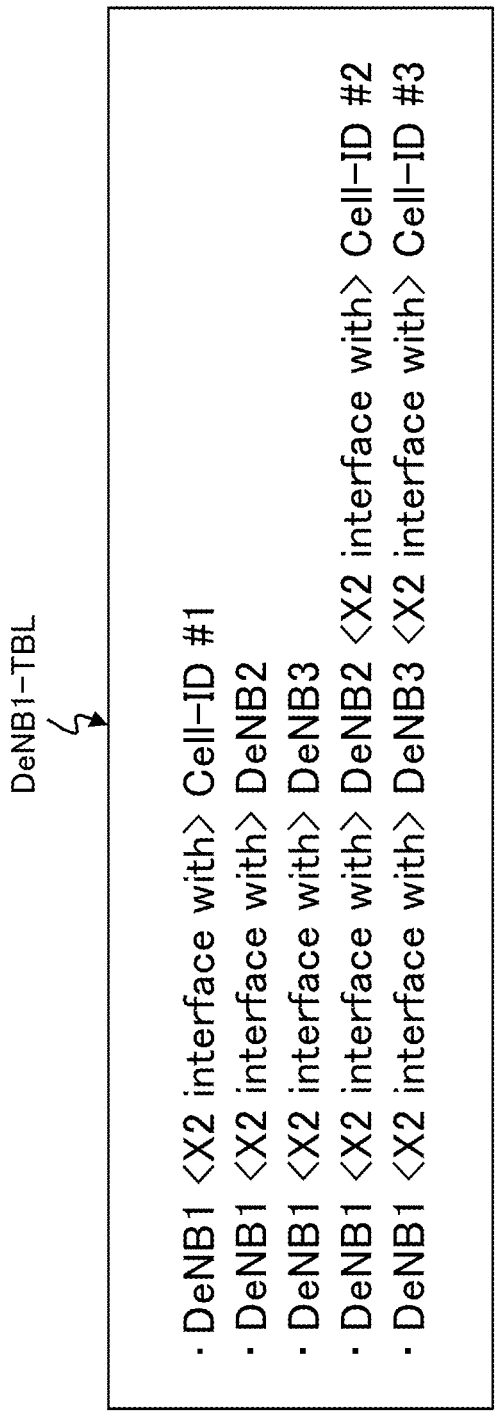
FIG. 14 is a schematic diagram showing an example of a X2 routing table provided in DeNB1.

FIG. 14 shows a X2 routing table DeNB1-TBL at the DeNB1 provided as an example. The X2 routing table DeNB1-TBL provides routes between the DeNB1 and each of DeNB2, DeNB3, Cell-ID#1, Cell-ID #2, and Cell-ID #3. The DeNB1 does not know whether Cell-ID #2 and Cell-ID #3 represent RNs but knows logical routing paths to them. In other words, the DeNB1 only knows Cell-ID #2 and Cell-ID #3 as communication nodes that connect to DeNB2 and DeNB3 through X2 interfaces, respectively.

Taking as an example the network shown in FIG. 13, a control operation of the system according to the third illustrative embodiment will be explained by making references to FIGS. 15-17.

3.1) System Operation

Figure 15:
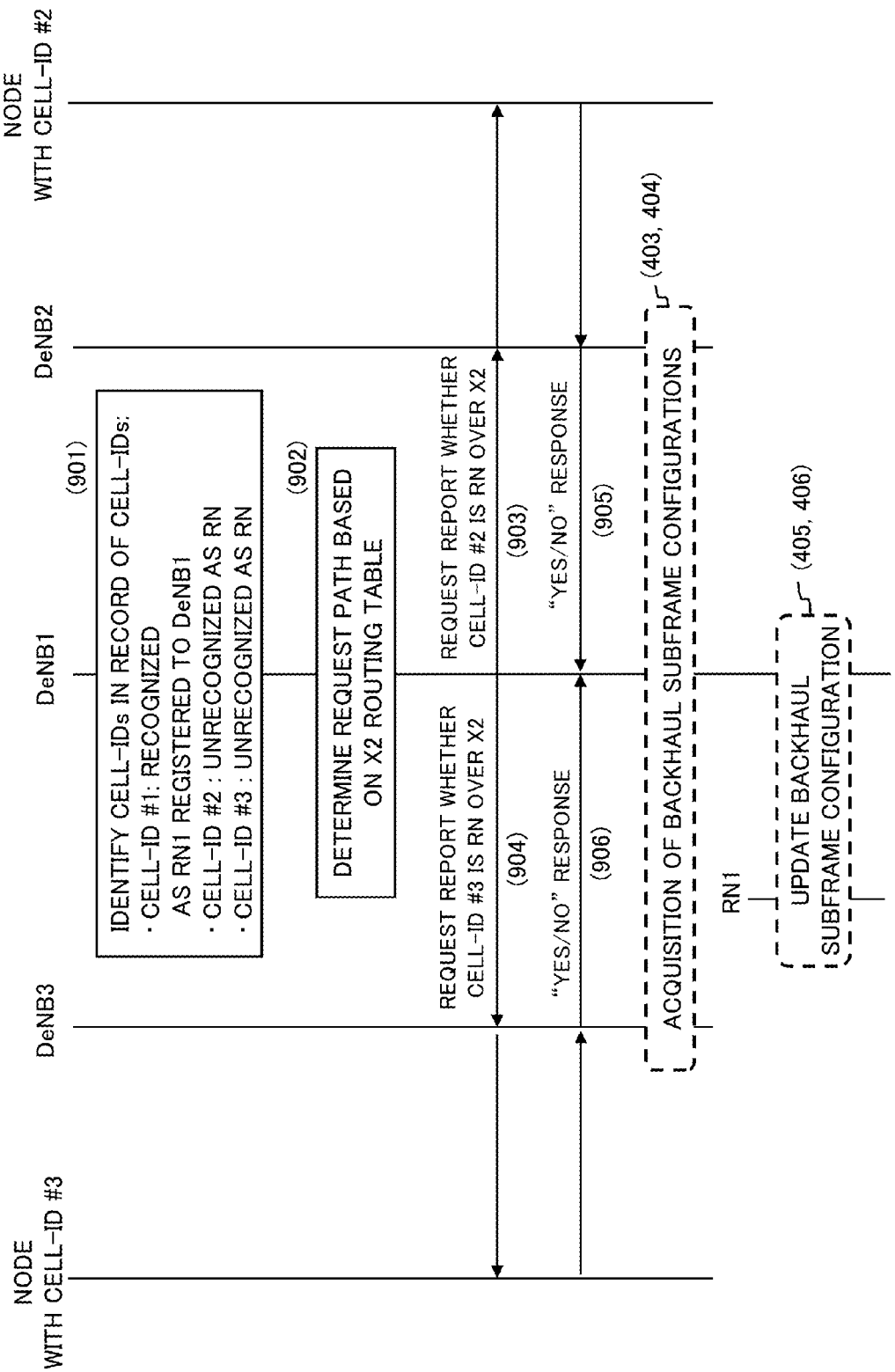
FIG. 15 is a sequence diagram showing the communication control method of the radio communication system according to the third illustrative embodiment.

Referring to FIG. 15, the DeNB1 identifies Cell-ID #1 as its RN1 and Cell-ID #2 and #3 as unrecognized (operation 901). As described in the second illustrative embodiment, the DeNB2 and DeNB3 recognize Cell-ID #2 and Cell-ID #3 as their RN2 and RN3, respectively. Preferably, the DeNB1 may select a plurality of Cell-IDs that cause interference greater than a predetermined level and are not recognized as its RN as unrecognized.

When the DeNB1 identifies Cell-ID #2 and Cell-ID #3 as unrecognized, the DeNB1 searches the DeNB1-TBL for routing paths to nodes with Cell-ID #2 and Cell-ID #3, respectively (operation 902). In this example, as shown in FIG. 14, the DeNB1 determines a path to Cell-ID #2 via the DeNB2 and a path to Cell-ID #3 via the DeNB3.

Subsequently, the DeNB1 requests a report from the node with unrecognized Cell-ID #2 whether the node with the Cell-ID #2 represents a RN (operation 903) and further requests a report from the node with unrecognized Cell-ID #3 whether the node with the Cell-ID #3 represents a RN (operation 904).

When having received the request from the DeNB1, the node with the Cell-ID #2 sends back to the DeNB1 a YES/NO response indicating whether the Cell-ID #2 represent a RN (operations 905) and similarly the node with the Cell-ID #3 sends back to the DeNB1 a YES/NO response indicating whether the Cell-ID #3 represent a RN (operation 906).

When receiving the YES responses from the nodes with Cell-ID #2 and Cell-ID #3, respectively, the DeNB1 starts the backhaul subframe configuration acquisition for each of the DeNB2 and DeNB3 (operation 403 and 404) and the update of backhaul subframe configuration for the RN1 based on the acquired backhaul subframe configurations (operations 405 and 406). The backhaul subframe configuration acquisition and the update of backhaul subframe configuration are similar to those described in FIG. 7 and therefore detailed descriptions are omitted.

3.2) DeNB Operation

Figure 16:
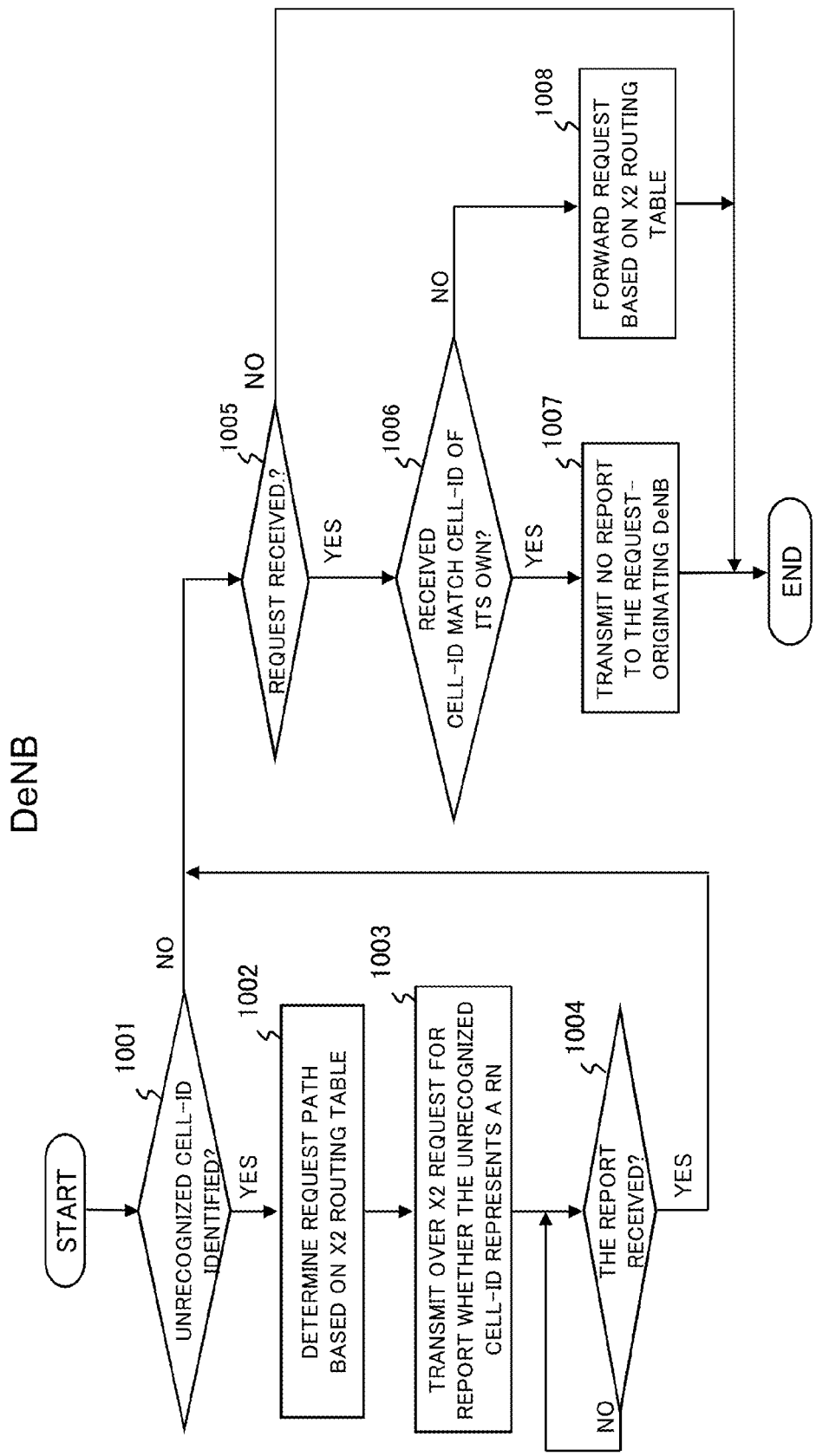
FIG. 16 is a flow chart showing the communication control method of the base station (DeNB) according to the third illustrative embodiment.

Referring to FIG. 16, the RN identification controller 107 identifies the Cell-IDs stored in the memory 106 and determines whether an unrecognized Cell-ID exists (operation 1001). When an unrecognized Cell-ID is found (operation 1001; YES), the RN identification controller 107 refers to the X2 routing table DeNB1-TBL to determine a request path to the node with the unrecognized Cell-ID (operation 1002) and transmits to the node with the unrecognized Cell-ID a request for report whether the unrecognized Cell-ID represents a RN (operation 1003) before entering a state of waiting for reception of the report (operation 1004).

When having received the report (operation 1004; YES) or when an unrecognized Cell-ID does not exist in the memory 106 (operation 1001; NO), the RN identification controller 107 determines whether a request for report whether a Cell-ID represents a RN is received from another DeNB (operation 1005). When such a request has been received from another DeNB (operation 1005; YES), the RN identification controller 107 further determines whether the destination Cell-ID of the received request matches the Cell-ID of the DeNB (operation 1006). If the destination Cell-ID of the received request is identical to the Cell-ID of its own (operation 1006; YES), the RN identification controller 107 determines that no report is sent back to the request-originating DeNB (operation 1007). If the destination Cell-ID of the received request is not identical to the Cell-ID of its own (operation 1006; NO), the RN identification controller 107 refers to the DeNB1-TBL to forward that request to the final destination with the Cell-ID of the received request (operation 1008).

3.3) RN Operation

Figure 17:
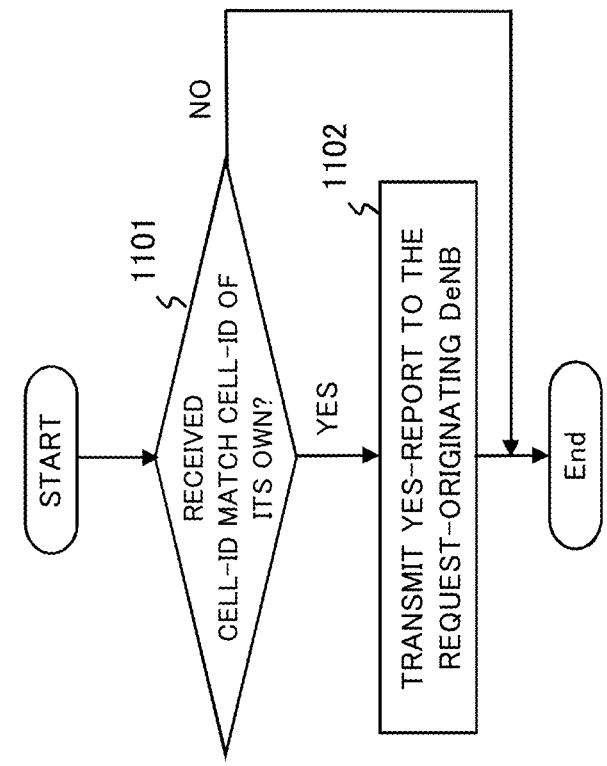
FIG. 17 is a flow chart showing the communication control method of the relay node (RN) according to the third illustrative embodiment.

Referring to FIG. 17, the RN information manager 207 determined whether the destination Cell-ID of a received request is identical to the Cell-ID of the RN itself (operation 1101). When the destination Cell-ID of a received request is identical to the Cell-ID of its own (operation 1101; YES), the RN information manager 207 transmits a YES report to the request-originating DeNB (operation 1102).

As a modified example, a report of the unrecognized Cell-ID being a RN may be sent back by another node on the logical routing path between the request-originating DeNB and the node with the unrecognized Cell-ID. For example, in FIG. 13, if the DeNB2 knows that the Cell-ID #2 represents RN2, the DeNB2 can send the report back to the DeNB1, instead of the node with the Cell-ID #2.

3.4) Advantageous Effect

As described above, according to the third illustrative embodiment, a DeNB can directly inquire node with unrecognized Cell-ID whether it is a RN, without involving other nodes that are not on the logical routing path, allowing reduced amount of signaling in the network. Other advantageous effects of the third illustrative embodiment including acquisition and update of backhaul subframe configuration are similar to those of the first illustrative embodiment.

4. FOURTH ILLUSTRATIVE EMBODIMENT

According to the fourth illustrative embodiment, each DeNB sends to another DeNB a report of a Cell-ID of its RN registered to the DeNB and information indicating that the Cell-ID represents a RN. In the fourth illustrative embodiment, the report is sent to the other DeNB without receiving a request from the other DeNB. Taking as an example the network shown in FIG. 3, a control operation of the above-mention system according to the fourth illustrative embodiment will be explained by making references to FIGS. 18-19.

4.1) System Operation

Figure 18:
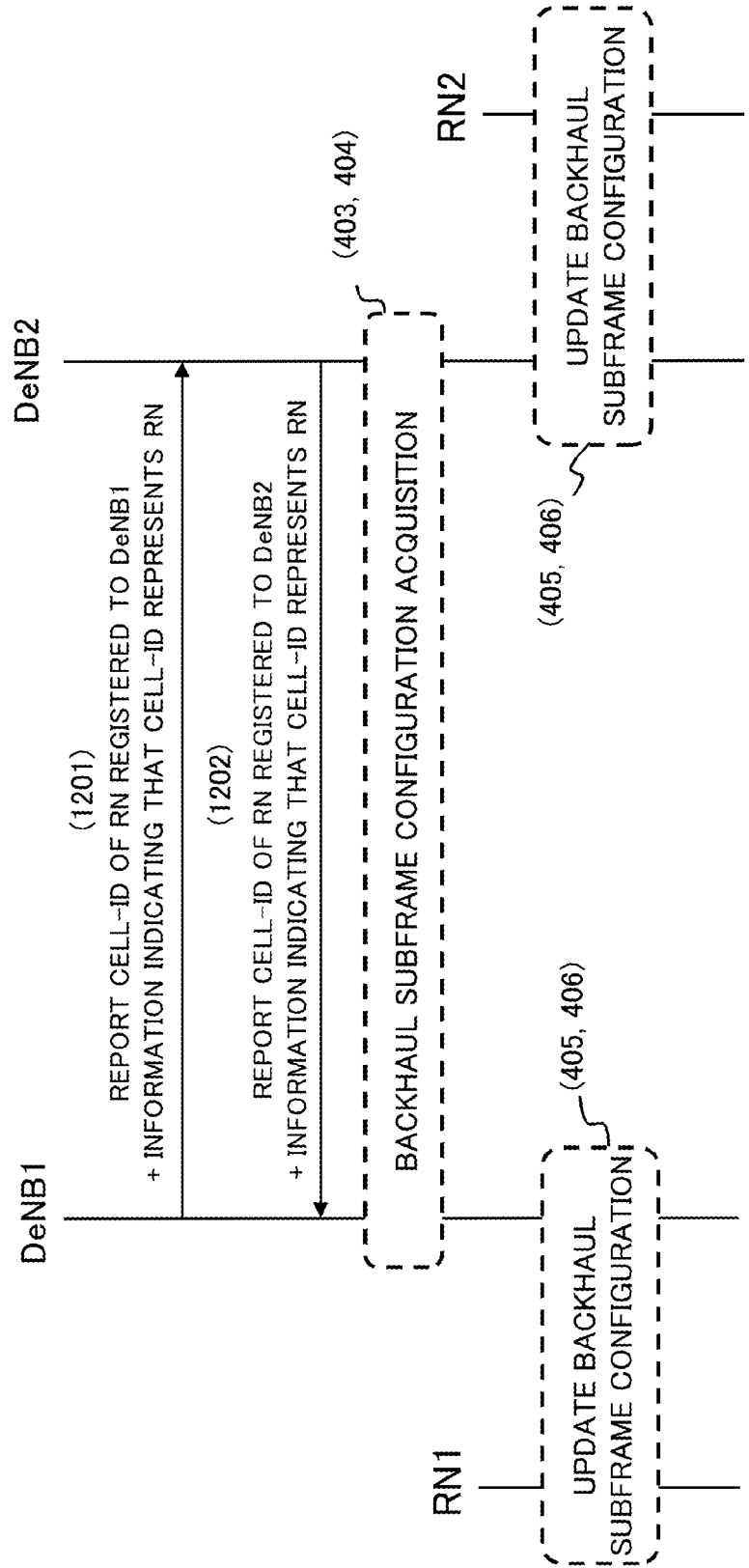
FIG. 18 is a sequence diagram showing the communication control method of the radio communication system according to a fourth illustrative embodiment.

Referring to FIG. 18, the DeNB1 transmits to the DeNB2 a report of Cell-ID of RN registered to itself and information indicating that the Cell-ID represents RN (operation 1201). The DeNB2 transmits to the DeNB1 a report of Cell-ID of RN registered to itself and information indicating that the Cell-ID represents RN (operation 1202). Thereafter, the DeNB1 starts the backhaul subframe configuration acquisition (operation 403 and 404) and the update of backhaul subframe configuration (operations 405 and 406). It is the same with the DeNB2. The backhaul subframe configuration acquisition and the update of backhaul subframe configuration are similar to those described in FIG. 7 and therefore detailed descriptions are omitted.

4.2) DeNB Operation

Figure 19:
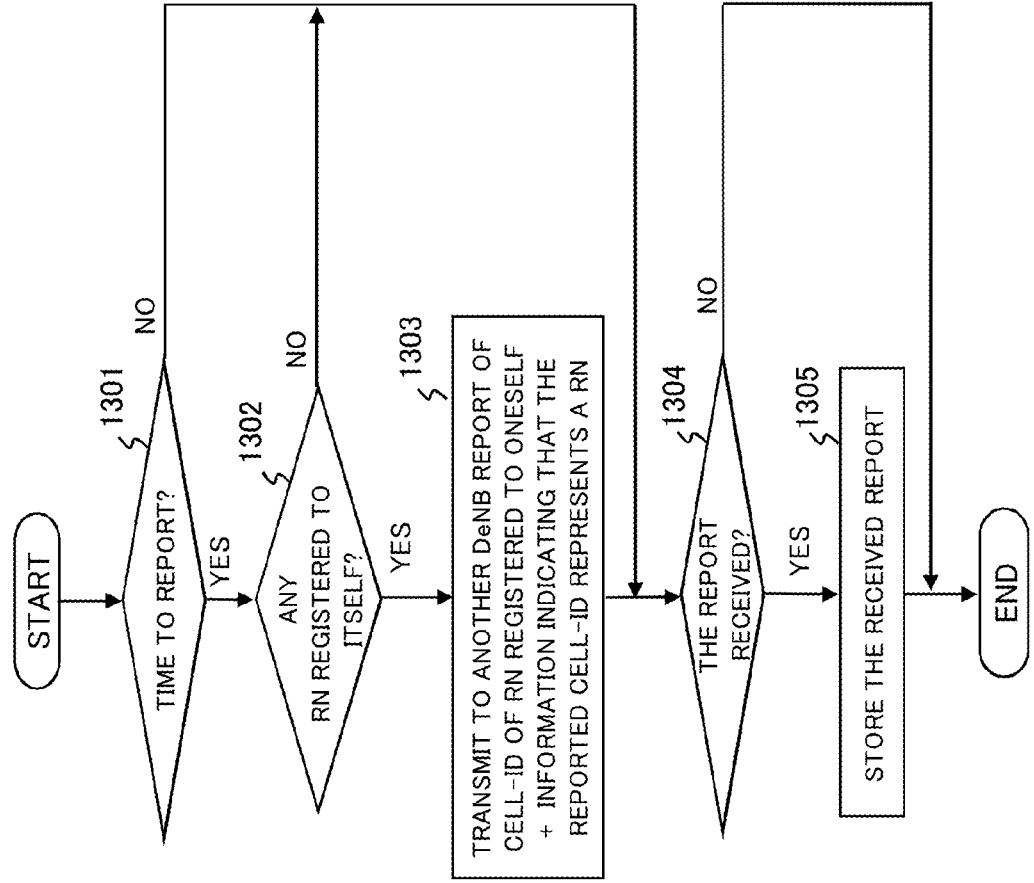
FIG. 19 is a flow chart showing the communication control method of the base station (DeNB) according to the fourth illustrative embodiment.

Referring to FIG. 19, the scheduler 105 checks whether it is time to issue a report of Cell-ID of RN registered to itself and information indicating that the Cell-ID represents RN (operation 1301). Time to issue the report can be controlled by operator or periodically, or when there is a change in the number of RNs and/or backhaul subframe configuration. When it is time to issue the report (operation 1301; YES), the RN identification controller 107 determines whether at least one RN is registered to the DeNB1 (operation 1302).

When there is at least one RN registered to the DeNB1 (operation 1302; YES), the RN identification controller 107 controls the scheduler 105 and transmits to another DeNB a report of Cell-ID of RN registered to the DeNB1 and information indicating that the Cell-ID represents a RN (operation 1303).

When it is not time to issue the report (operation 1301; NO), when there is no RN registered to the DeNB1 (operation 1302; NO), or after the operation 1303, the RN identification controller 107 determines whether any report has been received from another DeNB (operation 1304). When receiving the report from another DeNB (operation 1304; YES), the RN identification controller 107 stores information included in the received report in the memory 106 (operation 1305).

4.4) Advantageous Effect

As described above, according to the fourth illustrative embodiment, each DeNB can recognize a node registered to a different DeNB as a RN, allowing acquisition of necessary information and coordination of interference coming from the RN registered to the different DeNB. Other advantageous effects of the fourth illustrative embodiment including acquisition and update of backhaul subframe configuration are similar to those of the first illustrative embodiment.

5. Fifth ILLUSTRATIVE EMBODIMENT

According to the fifth illustrative embodiment, each DeNB acquires RN-identity and backhaul subframe configuration of RN registered to another DeNB by the acquisition procedure as described in the first to fourth illustrative embodiments. The DeNB stores the RN-identity information received from another DeNB and notifies the RN registered to the DeNB of the RN identity information of adjacent RN. Based on the notified information, the RN registered to the DeNB can control a handover (HO) condition such as updating of priority for HO to the adjacent RN. Taking as an example the network shown in FIG. 3, a control operation of the system according to the fifth illustrative embodiment will be explained by making references to FIGS. 20-22.

5.1) System Operation

Figure 20:
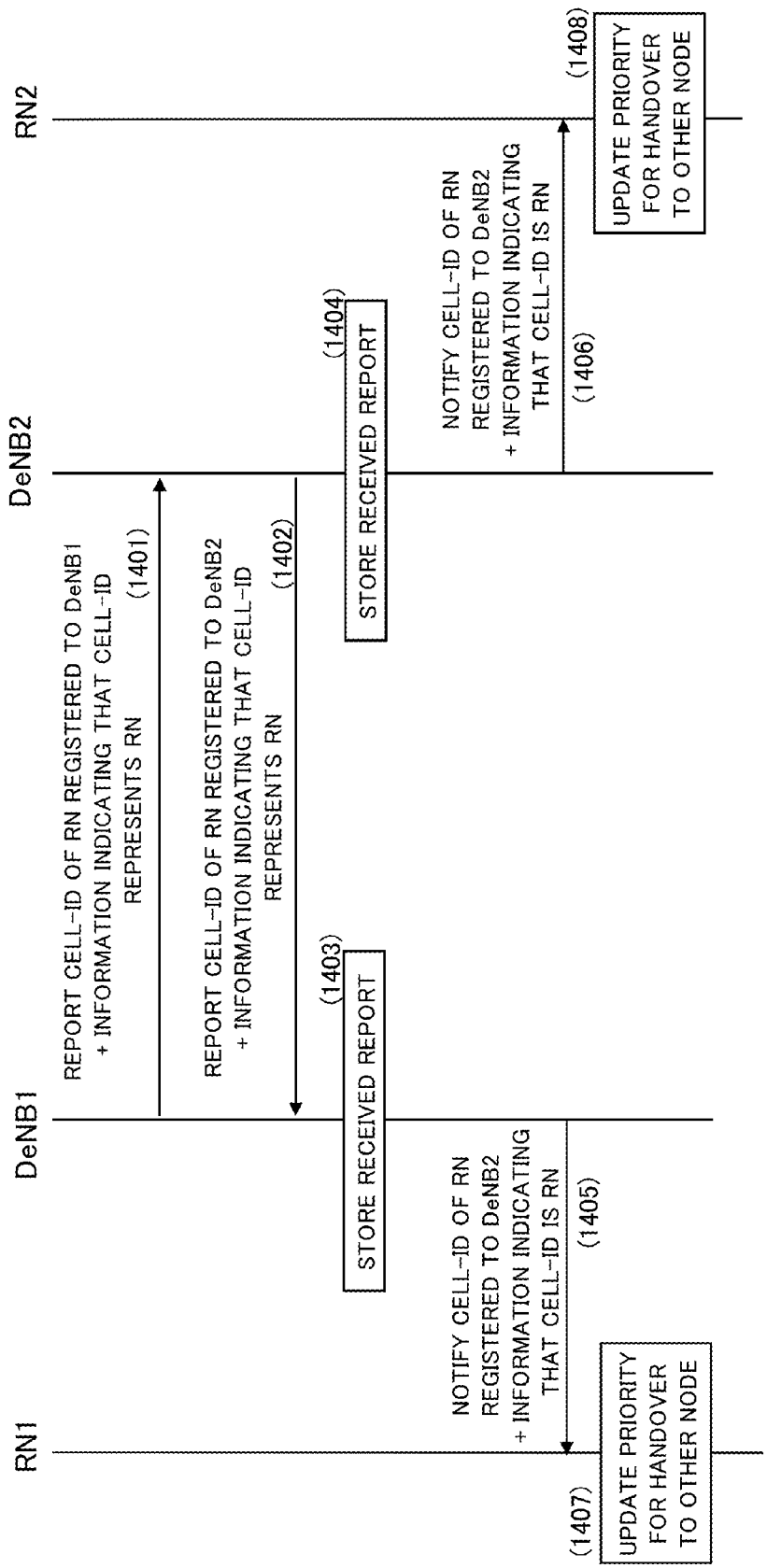
FIG. 20 is a sequence diagram showing the communication control method of the radio communication system according to a fifth illustrative embodiment.

Referring to FIG. 20, the DeNB1 transmits to the DeNB2 a report of Cell-ID of RN registered to itself and information indicating that the Cell-ID represents RN (operation 1401). The DeNB2 transmits to the DeNB1 a report of Cell-ID of RN registered to itself and information indicating that the Cell-ID represents RN (operation 1402). The DeNB1 stores the report received from DeNB2 (operations 1403) and notifies the RN1 of information related to the RN2 (Cell-ID of the RN2 and RN-indicating information) based on the stored report (operation 1405). Similarly, the DeNB2 stores the report received from DeNB1 (operations 1404) and notifies the RN2 of information related to the RN1 (Cell-ID of the RN1 and RN-indicating information) based on the stored report (operation 1406). The RN1 and RN2, when receiving information related to RN1 and RN2, update priority for HO to adjacent RN based on the received information (operations 1407, 1408).

In addition, as described in the first illustrative embodiment, the DeNB1 starts the backhaul subframe configuration acquisition (operation 403 and 404) and the update of backhaul subframe configuration (operations 405 and 406). It is the same with the DeNB2. The backhaul subframe configuration acquisition and the update of backhaul subframe configuration are similar to those described in FIG. 7 and therefore detailed descriptions are omitted.

5.2) DeNB Operation

Figure 21:
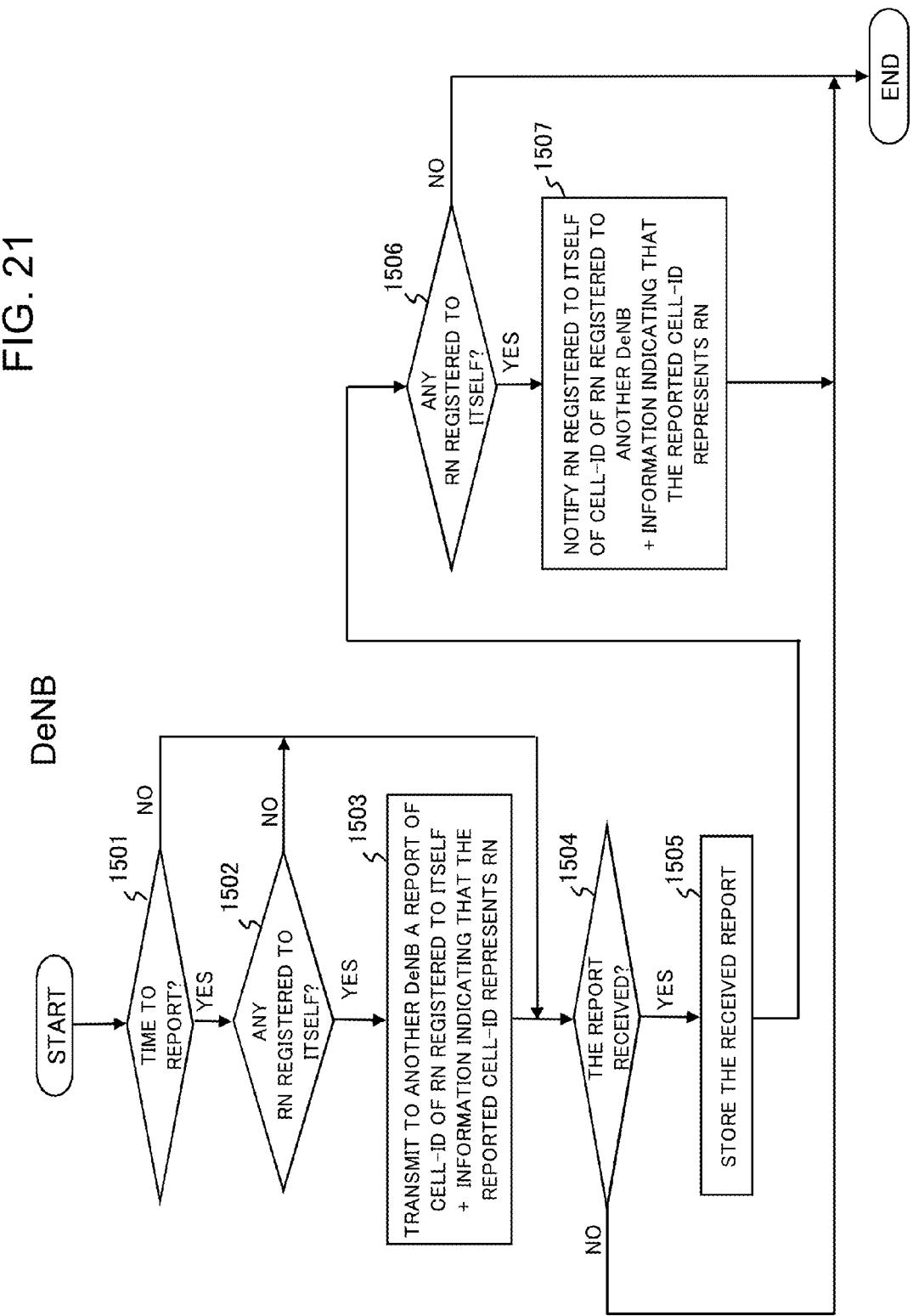
FIG. 21 is a flow chart showing the communication control method of the base station (DeNB) according to the fifth illustrative embodiment.

Referring to FIG. 21, the scheduler 105 checks whether it is time to issue a report of Cell-ID of RN registered to itself and information indicating that the Cell-ID represents RN (operation 1501). Time to issue the report can be controlled by operator or periodically, or when there is a change in the number of RNs and/or backhaul subframe configuration. When it is time to issue the report (operation 1501; YES), the RN identification controller 107 determines whether at least one RN is registered to itself (operation 1502).

When there is at least one RN registered to itself (operation 1502; YES), the RN identification controller 107 controls the scheduler 105 and transmits to another DeNB a report of Cell-ID of RN registered to itself and information indicating that the Cell-ID represents a RN (operation 1503).

When it is not time to issue the report (operation 1501; NO), when there is no RN registered to itself (operation 1502; NO), or after the operation 1503, the RN identification controller 107 determines whether any report has been received from another DeNB (operation 1504). When receiving the report from another DeNB (operation 1504; YES), the RN identification controller 107 stores information included in the received report in the memory 106 (operation 1505). Thereafter, the RN identification controller 107 determines whether at least one RN is registered to itself (operation 1506).

When there is at least one RN registered to itself (operation 1506; YES), the RN identification controller 107 controls the scheduler 105 and notifies the RN registered to itself DeNB of the reported information including Cell-ID of RN registered to another DeNB and information indicating that the Cell-ID represents a RN (operation 1507).

When no report has been received from another DeNB (operation 1504; NO) or when there is no RN registered to itself (operation 1506; NO), the procedure is terminated.

5.3) RN Operation

Figure 22:
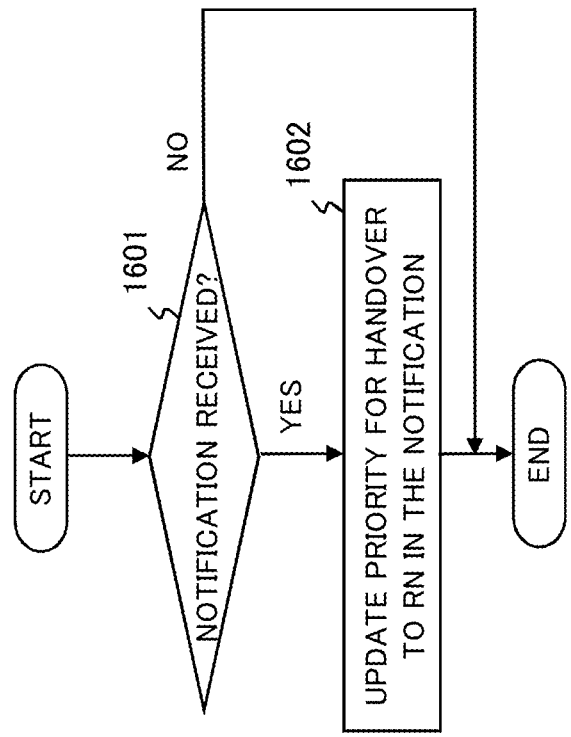
FIG. 22 is a flow chart showing the communication control method of the relay node (RN) according to the fifth illustrative embodiment.

As shown in FIG. 22, when notified of Cell-ID of RN registered to another DeNB and information indicating that the Cell-ID represents a RN (operation 1601; YES), the RN information manager 207 updates the priority for handover to adjacent RN based on information indicated by the notification (operation 1602). As an example, the priority for handover to adjacent RN can be implemented as follows:

For high mobility RN-UE, the priority for HO to adjacent RN is lower than the priority for HO to adjacent DeNB; and For low mobility RN-UE, the priority for HO to adjacent RN is higher than the priority for HO to adjacent DeNB.

Alternatively, the above-mentioned HO priority updating can be made at the DeNB based on the storage of the received report.

5.4) Advantageous Effect

As described above, according to the fifth illustrative embodiment, a DeNB or a RN registered to the DeNB can recognize a node registered to a different DeNB as a RN. Accordingly, based on the information related to RN registered to a different DeNB, the DeNB or the RN can adjust priority for HO to an adjacent RN, resulting in reduced radio link failure due to failed HO. Other advantageous effects of the fifth illustrative embodiment including acquisition and update of backhaul subframe configuration are similar to those of the first illustrative embodiment.

6. SIXTH ILLUSTRATIVE EMBODIMENT

According to the sixth illustrative embodiment, each DeNB requests another DeNB to report a Cell-ID of RN registered to the other DeNB and the other DeNB reports, as a response to the request, a Cell-ID of RN registered to itself. Each DeNB determines a dominant interfering RN based on a record of Reference Signal Received Power (RSRP) measured by its UEs and the Cell-ID of RN reported by the other DeNB. Accordingly, each DeNB can acquire backhaul subframe configuration applied at the dominant interfering RN, and update backhaul subframe configurations applied at its RNs based on the backhaul subframe configuration received from the dominant interfering RN. First, a radio communication system to which the sixth illustrative embodiment is applied will be explained as an example by making references to FIGS. 23 and 24. In this example, only the operation of DeNB1 will be shown because DeNB2 can also assume the same operation.

6.1) System

Figure 23:
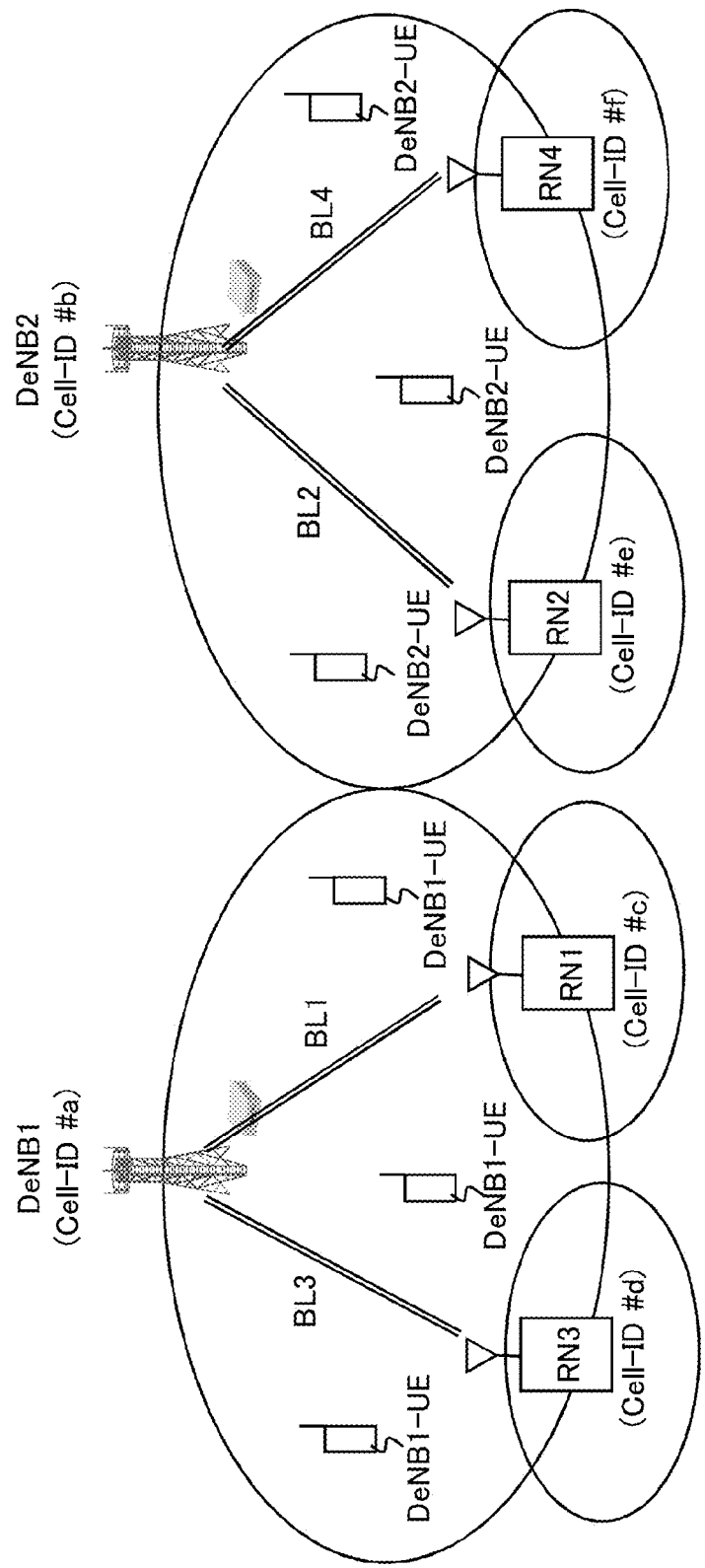
FIG. 23 is a schematic diagram showing a radio communication system to which a sixth illustrative embodiment is applied.

As shown in FIG. 23, it is assumed for simplicity that a radio communication system is comprised of a plurality of nodes which include two base stations (DeNB1, DeNB2), relay nodes (RN1-RN4), and a plurality of DeNB1-UEs. The DeNB1 provides a radio connection to the RN1 and RN3 through backhaul links (or Un links) BL1 and BL3, respectively. The DeNB2 provides a radio connection to the RN2 and RN4 through backhaul links (or Un links) BL2 and BL4, respectively. In this example, the RN1-RN4 are assigned Cell-ID#c, Cell-ID #e, Cell-ID #d, and Cell-ID #f, respectively.

6.2) System Operation

Referring to FIG. 24, the DeNB1 sends to each DeNB1-UE a request for a report of RSRP caused by adjacent nodes (operation 1701). In response to the request, each DeNB1-UE measures RSRP caused by adjacent nodes and sends to the DeBN1 a RSRP report of RSRP measurements and Cell-IDs of the adjacent nodes corresponding to the RSRP measurement (operation 1702). When having received the RSRP report from each DeNB1-UE, the DeNB1 creates a RSRP list indicating Cell-IDs of the adjacent nodes corresponding to the RSRP measurement and stores it in the memory 106 (operation 1703). In FIG. 24, the RSRP list contains Cell-IDs #a, #b, #c, #d and #e.

Subsequently, the DeNB1 sends to another DeNB (here, DeNB2) a request for a Cell-ID report of Cell-IDs of RNs registered to the DeNB2 (operation 1704) and receives the Cell-ID report as a response to the request from the DeNB2 (operation 1705). In this example, the Cell-ID report indicates Cell-IDs #e and #f of the RN 2 and RN4 which are registered to the DeNB2.

When having received the Cell-ID report from the DeNB2, the RN identification controller 107 determines dominant interfering RNs based on the stored RSRP information and the Cell-ID reports. For example, with the initial condition: the RSRP list contains Cell-IDs #a, #b, #c, #d and #e and the Cell-ID report received from the DeNB2 indicates Cell-IDs #e and #f, the determination of dominant interfering RN registered to DeNB2 is performed as follows: if a Cell-ID exists in both the RSRP list and the Cell-ID report, the node with the Cell-ID is a dominant interfering RN. In this example, it is determined that Cell-ID #e represents the dominant interfering RN.

After the dominant interfering RN has been determined, the DeNB1 starts acquisition of backhaul subframe configuration by requesting a configuration report of the backhaul subframe configuration of the dominant interfering RN with Cell-ID #e (operation 1707). As a response to the configuration request, the DeNB1 receives the configuration report from the DeNB2 and acquires the backhaul subframe configuration of the dominant interfering RN with Cell-ID #e (operation 1708).

The DeNB1 uses the backhaul subframe configuration of the dominant interfering RN to determine the backhaul configuration of its own so as to minimize interference with the dominant interfering RN (operation 1709). Thereafter, the DeNB1 performs RRC connection re-configuration to apply the determined backhaul subframe configurations (operation 1710).

6.3) Advantageous Effect

As described above, according to the sixth illustrative embodiment, only a RN registered to different DeNB that generates dominant interference is selected for performing interference coordination. Accordingly, the amount of signaling overhead required for acquiring backhaul subframe configuration can be reduced. Other advantageous effects of the sixth illustrative embodiment including update of backhaul subframe configuration are similar to those of the first illustrative embodiment.

INDUSTRIAL APPLICABILITY

The present invention can be applied to a communication system with relay nodes.

REFERENCE SIGNS LIST

10 Base station (DeNB)
11 DeNB cell
20 Relay node (RN)
30 User equipment (UE)

The invention claimed is:

1. A communication system comprising a plurality of communication nodes which includes a plurality of base stations and a plurality of relay nodes, wherein each relay node has a radio connection with a base station,
   wherein each base station exchanges information indicating identity of a relay node with another base station by requesting the other base station to report information indicating identity of a relay node connected with the other base station,
   wherein when the base station detects a plurality of unrecognized identities of communication nodes, the base station selects at least one unrecognized identity from the plurality of unrecognized identities depending on interference levels coming from the communication nodes and requests the other base station to report whether the at least one unrecognized identity represents a relay node connected to the other base station,
   wherein the system improves radio communication between base stations and nodes by reporting information about relay nodes during information exchanges.

2. The communication system of claim 1, wherein each base station receives RN-related information from the other base station, wherein the RN-related information includes identity of a relay node connected with the other base station.

3. The communication system of claim 2, wherein each base station acquires radio resource configuration applied at the relay node connected with the other base station based on the RN-related information.

4. The communication system of claim 1, wherein when each base station detects an unrecognized identity of a communication node, the base station requests the communication node via another base station to report whether the communication node is a relay node connected to the other base station.

5. The communication system of claim 1, wherein each base station sends information indicating identity of a relay node connected with itself to another base station.

6. The communication system of claim 1, wherein each base station notifies a relay node connected to itself of the information indicating identity of a relay node connected to the other base station.

7. The communication system of claim 6, wherein the relay node, when receiving the information indicating identity of a relay node connected to the other base station, updates conditions for handover to another communication node.

8. The communication system of claim 7, wherein the relay node updates the conditions for handover depending on use status of a user terminal connected to itself.

9. The communication system of claim 1, wherein each base station requests communication nodes connected to itself to report interference information indicating identities of interfering communication nodes and determines at least one dominant interfering communication node based on the interference information and the information indicating identity of a relay node connected with the other base station.

10. A communication method in a communication system comprising a plurality of communication nodes which includes a plurality of base stations and a plurality of relay nodes, wherein each relay node has a radio connection with a base station, the method comprising:
at base stations,
exchanging information indicating identity of a relay node with each another by one base station requesting the other base station to report information indicating identity of a relay node connected with the other base station,
wherein when the base station detects a plurality of unrecognized identities of communication nodes, the base station selects at least one unrecognized identity from the plurality of unrecognized identities depending on interference levels coming from the communication nodes and requests the other base station to report whether the at least one unrecognized identity represents a relay node connected to the other base station,
wherein the system improves radio communication between base stations and nodes by reporting information about relay nodes during information exchanges.

11. The communication method of claim 10, wherein each base station receives RN-related information from the other base station, wherein the RN-related information includes identity of a relay node connected with the other base station.

12. The communication method of claim 11, wherein each base station acquires radio resource configuration applied at the relay node connected with the other base station based on the RN-related information.

13. The communication method of claim 10, wherein when each base station detects an unrecognized identity of a communication node, the base station requests the communication node via another base station to report whether the communication node is a relay node connected to the other base station.

14. The communication method of claim 10, wherein each base station sends information indicating identity of a relay node connected with itself to another base station.

15. The communication method of claim 10, wherein each base station notifies a relay node connected to itself of the information indicating identity of a relay node connected to the other base station.

16. The communication method of claim 15, wherein the relay node, when receiving the information indicating identity of a relay node connected to the other base station, updates conditions for handover to another communication node.

17. The communication method of claim 16, wherein the relay node updates the conditions for handover depending on use status of a user terminal connected to itself.

18. The communication method of claim 10, wherein each base station requests communication nodes connected to itself to report interference information indicating identities of interfering communication nodes and determines at least one dominant interfering communication node based on the interference information and the information indicating identity of a relay node connected with the other base station.

19. A base station in a communication system comprising a plurality of communication nodes which includes a plurality of base station and a plurality of relay nodes, wherein each relay node has a radio connection with a base station, comprising:
a communication section for communicating with a relay node by a radio interface and communicating with another base station by a predetermined interface; and
a controller for exchanging information indicating identity of a relay node with another base station by requesting the other base station to report information indicating identity of a relay node connected with the other base station,
wherein when detecting a plurality of unrecognized identities of communication nodes, the controller selects at least one unrecognized identity from the plurality of unrecognized identities depending on interference levels coming from the communication nodes and requests the other base station to report whether the at least one unrecognized identity represents a relay node connected to the other base station,
wherein the system improves radio communication between base stations and nodes by reporting information about relay nodes during information exchanges.

20. The base station of claim 19, wherein the controller receives RN-related information from the other base station, wherein the RN-related information includes identity of a relay node connected with the other base station.

21. The base station of claim 20, wherein the controller acquires radio resource configuration applied at the relay node connected with the other base station based on the RN-related information.

22. The base station of claim 19, wherein when detecting an unrecognized identity of a communication node, the controller requests the communication node via another base station to report whether the communication node is a relay node connected to the other base station.

23. The base station of claim 19, wherein the controller sends information indicating identity of a relay node connected with itself to another base station.

24. The base station of claim 19, wherein the controller notifies a relay node connected to itself of the information indicating identity of a relay node connected to the other base station.

25. The base station of claim 24, wherein when receiving the information indicating identity of a relay node connected to the other base station, the controller updates conditions for handover to another communication node.

26. The base station of claim 25, wherein the controller updates the conditions for handover depending on use status of a user terminal connected to itself.

27. The base station of claim 19, wherein the controller requests communication nodes connected to itself to report interference information indicating identities of interfering communication nodes and determines at least one dominant interfering communication node based on the interference information and the information indicating identity of a relay node connected with the other base station.

* * * * *